US012724156B1

(12) United States Patent
Baker et al.

(10) Patent No.: US 12,724,156 B1
(45) Date of Patent: Sep. 1, 2026

(54) LIGHT DETECTION AND RANGING (LIDAR) SENSOR SYSTEM USING FAST HADAMARD TRANSFORM (FHT)

(71) Applicant: Aurora Operations, Inc., Pittsburgh, PA (US)

(72) Inventors: Devlin Baker, Bozeman, MT (US); Zeb William Barber, Bozeman, MT (US); Craig Benko, Livingston, MT (US); Matthew Fetterman, Bozeman, MT (US); Mohsen Nadertehrani, Fremont, CA (US); Philip Warshowsky, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 113 days.

(21) Appl. No.: 18/625,887

(22) Filed: Apr. 3, 2024

(51) Int. Cl.
*G01S 17/931* (2020.01)
*B60W 60/00* (2020.01)
*G01S 7/4915* (2020.01)

(52) U.S. Cl.
CPC ......... *G01S 17/931* (2020.01); *B60W 60/001* (2020.02); *G01S 7/4915* (2013.01); *B60W 2420/408* (2024.01)

(58) Field of Classification Search
CPC ............ G01S 17/00; B60W 2420/408; B60W 2420/60
See application file for complete search history.

(56) References Cited

U.S. PATENT DOCUMENTS 10,366,310 B2 * 7/2019 Zermas .................. G06T 7/174
10,422,880 B2 * 9/2019 Crouch .................. G01S 17/26
10,742,475 B2 * 8/2020 Lai ...................... H04L 25/0224
10,768,282 B2 * 9/2020 Crouch ................ G01S 7/4817
(Continued)

FOREIGN PATENT DOCUMENTS

EP 3879298 A2 * 9/2021 .......... G01S 5/0218
EP 4375700 A2 * 5/2024 ............ G06N 3/045
(Continued)

OTHER PUBLICATIONS

S. Banzhaf and C. Waldschmidt, "Phase-Code-Based Modulation for Coherent Lidar," in IEEE Transactions on Vehicular Technology, vol. 70, No. 10, pp. 9886-9897, Oct. 2021, (Year: 2021).*
(Continued)

*Primary Examiner* — Berhanu Tadese
(74) *Attorney, Agent, or Firm* — Dority & Manning, P.A.

(57) ABSTRACT

A light detection and ranging (LIDAR) system may include one or more processors configured to transmit an optical signal to an environment. The one or more processors may receive, from the environment, a returned optical signal in response to transmitting the optical signal. The one or more processors may generate, based on the returned optical signal, an electrical signal. The one or more processors may determine a Doppler frequency shift in the returned optical signal based on the electrical signal. The one or more processors may adjust the electrical signal using the Doppler frequency shift. The one or more processors may divide the adjusted electrical signal into a plurality of electrical signals. The one or more processors may determine a range of the returned optical signal by performing an operation on the plurality of electrical signals in parallel.

20 Claims, 23 Drawing Sheets

(56) References Cited

U.S. PATENT DOCUMENTS

| | | | | |
|---|---|---|---|---|
| 10,838,045 | B2 * | 11/2020 | Crouch | G01S 7/4817 |
| 11,585,925 | B2 * | 2/2023 | Crouch | G01S 17/58 |
| 11,656,343 | B2 * | 5/2023 | Crouch | G01S 7/4817 356/5.1 |
| 11,663,833 | B2 * | 5/2023 | Popov | G01S 13/589 382/104 |
| 11,953,677 | B2 * | 4/2024 | Crouch | G01S 7/4817 |
| 12,072,421 | B2 * | 8/2024 | Crouch | G01S 13/343 |
| 12,196,854 | B2 * | 1/2025 | Crouch | G01S 17/58 |
| 12,249,028 | B2 * | 3/2025 | Ranganath | G06N 20/00 |
| 12,360,245 | B2 * | 7/2025 | Salsbury | G01S 17/58 |
| 12,442,927 | B2 * | 10/2025 | Shettigara | G01S 17/42 |
| 12,445,166 | B2 * | 10/2025 | Schmitz | H04B 1/7093 |
| 2018/0075320 | A1 * | 3/2018 | Zermas | G01S 13/931 |
| 2018/0088235 | A1 * | 3/2018 | Haslim | G01S 7/4812 |
| 2018/0224547 | A1 * | 8/2018 | Crouch | G01S 17/32 |
| 2019/0327124 | A1 * | 10/2019 | Lai | G01S 5/017 |
| 2019/0361122 | A1 * | 11/2019 | Crouch | G01S 7/487 |
| 2020/0150251 | A1 * | 5/2020 | Crouch | G01S 7/4817 |
| 2020/0182982 | A1 * | 6/2020 | Sun | G01S 7/4865 |
| 2020/0333441 | A1 * | 10/2020 | Diaz | G02F 1/09 |
| 2020/0386875 | A1 * | 12/2020 | Crouch | G01S 7/4817 |
| 2021/0055734 | A1 * | 2/2021 | Yokev | G08G 1/163 |
| 2021/0278536 | A1 * | 9/2021 | Crouch | G01S 7/4915 |
| 2022/0099837 | A1 * | 3/2022 | Crouch | G01S 13/931 |
| 2022/0187458 | A1 * | 6/2022 | Piggott | G01S 17/36 |
| 2022/0187468 | A1 * | 6/2022 | Matthews | G01S 7/4815 |
| 2022/0244363 | A1 * | 8/2022 | Barber | G01S 7/4917 |
| 2022/0366701 | A1 * | 11/2022 | Popov | G01S 7/411 |
| 2023/0161038 | A1 * | 5/2023 | Crouch | G01S 17/26 356/5.09 |
| 2023/0204730 | A1 * | 6/2023 | Yu | G01S 7/487 356/4.01 |
| 2023/0204737 | A1 * | 6/2023 | Jain | G01S 17/89 356/4.01 |
| 2023/0213621 | A1 * | 7/2023 | Rekow | G01S 7/4817 356/5.01 |
| 2023/0252797 | A1 * | 8/2023 | Popov | G01S 13/325 382/104 |
| 2023/0367014 | A1 * | 11/2023 | Nestinger | G01S 7/4817 |
| 2023/0400554 | A1 * | 12/2023 | Piggott | G01B 11/22 |
| 2024/0053482 | A1 * | 2/2024 | Michaels | G02B 1/02 |
| 2024/0094354 | A1 * | 3/2024 | Piggott | G02F 1/0147 |
| 2024/0094360 | A1 * | 3/2024 | Piggott | G01S 7/4917 |
| 2024/0103167 | A1 * | 3/2024 | Piggott | G01S 7/493 |
| 2024/0111051 | A1 * | 4/2024 | Gupta | G06V 20/52 |
| 2024/0168141 | A1 * | 5/2024 | Gautam | G01S 7/4816 |
| 2024/0183957 | A1 * | 6/2024 | Rangarajan | G01S 7/484 |
| 2024/0201377 | A1 * | 6/2024 | Nestinger | G01S 17/89 |
| 2024/0201386 | A1 * | 6/2024 | Rekow | G01S 17/931 |
| 2024/0264290 | A1 * | 8/2024 | Payne | G01S 17/32 |
| 2024/0288552 | A1 * | 8/2024 | Milgrome | G01S 7/497 |
| 2024/0288583 | A1 * | 8/2024 | Banas | G01S 17/931 |
| 2024/0348283 | A1 * | 10/2024 | Schmitz | H04B 1/7093 |
| 2024/0377541 | A1 * | 11/2024 | Crouch | G01S 13/42 |
| 2025/0022287 | A1 * | 1/2025 | Banas | G01S 17/931 |
| 2025/0180743 | A1 * | 6/2025 | Khatana | G01S 17/931 |
| 2025/0180894 | A1 * | 6/2025 | Crouch | G01S 7/4816 |
| 2025/0277905 | A1 * | 9/2025 | Salsbury | G01S 7/4814 |

FOREIGN PATENT DOCUMENTS

| | | | | | |
|---|---|---|---|---|---|
| EP | 3881096 | B1 | * | 7/2024 | G01S 17/931 |
| EP | 4397993 | A2 | * | 7/2024 | G01S 17/26 |
| EP | 4425210 | A2 | * | 9/2024 | G01S 17/931 |
| WO | WO-2018144853 | A1 | * | 8/2018 | G01S 17/26 |
| WO | WO-2020072547 | A1 | * | 4/2020 | G01S 17/42 |
| WO | WO-2020102253 | A1 | * | 5/2020 | G01S 7/4914 |
| WO | WO-2021090285 | A2 | * | 5/2021 | G06V 20/58 |
| WO | WO-2022072487 | A1 | * | 4/2022 | G01S 17/89 |
| WO | WO-2022119973 | A1 | * | 6/2022 | G01S 7/4814 |
| WO | WO-2022132822 | A1 | * | 6/2022 | G01S 7/4917 |
| WO | WO-2022132827 | A1 | * | 6/2022 | G01S 7/4865 |
| WO | WO-2023034939 | A1 | * | 3/2023 | G01S 7/487 |
| WO | WO-2023129725 | A1 | * | 7/2023 | G01S 7/4815 |
| WO | WO-2023129930 | A1 | * | 7/2023 | G01S 7/4815 |
| WO | WO-2023219957 | A1 | * | 11/2023 | G01S 7/4817 |
| WO | WO-2023235873 | A1 | * | 12/2023 | G01S 17/34 |
| WO | WO-2024130162 | A1 | * | 6/2024 | G06V 20/56 |
| WO | WO-2024167751 | A1 | * | 8/2024 | G01S 17/89 |

OTHER PUBLICATIONS

C. A. O. Quero, D. Durini, J. d. J. Rangel-Magdaleno, J. Martinez-Carranza and R. Ramos-Garcia, “2D NIR-SPI spatial resolution evaluation under scattering condition,” 2022 19th International Conference on Electrical Engineering, Computing Science and Automatic Control (CCE), Mexico City, Mexico, 2022, (Year: 2022).*

S. P. Bhooplapur, F. J. Quinlan, M. Akbulut and P. J. Delfyett, “Linear Technique for Discrimination of Optically Coded Waveforms Using Optical Frequency Combs,” in IEEE Photonics Technology Letters, vol. 24, No. 19, pp. 1673-1676, Oct. 1, 2012, (Year: 2012).*

Z. Yao et al., “An Efficient Scattering Imaging Recovering Method via a Multimode Optical Fiber,” in Journal of Lightwave Technology, vol. 43, No. 9, pp. 4500-4506, 1 May 1, 2025, (Year: 2025).*

M. Cohn and A. Lempel, “On fast M-sequence transforms (Corresp. ),” in IEEE Transactions on Information Theory, vol. 23, No. 1, pp. 135-137, Jan. 1977, (Year: 1977).*

Cohn et al. “On Fast M-Sequence Transforms”, IEEE Transactions on Information Theory, Jan. 1977, p. 135-137.

* cited by examiner 100
120
Vehicle Control System
150
Control Subsystem
Localization
152
Perception
154
Planning
156
Control
158
124
Memory
Instructions
126
130
Sensors
RADAR
134
LIDAR
136
3D Positioning
138
Camera
140
IMU
142
Processor
122
110
Control System
Direction Control
112
Powertrain Control
114
Brake Control
116
102
Power Train
Energy Source
106
Prime Mover
104
Drivetrain
108
Computing System
172
Network
170
Network I/F
162
User I/F
164

220
PHASE /Δφ
225
0 0 0 1 1 0 1 0 1 0
NON-SHIFTED RETURN 226
DOPPLER SHIFTED RETURN 227
222
AMPLITUDE IN FREQUENCY BIN
224a
224b

230
PEAK 235
NON-SHIFTED RETURN 236
DOPPLER SHIFTED RETURN 237
232
234
CROSS CORRELATION

LIGHT DETECTION AND RANGING (LIDAR) SENSOR SYSTEM USING FAST HADAMARD TRANSFORM (FHT)

BACKGROUND

Optical detection of range using lasers, often referenced by a mnemonic, lidar, for light detection and ranging, is used for a variety of applications, from altimetry, to imaging, to collision avoidance. Lidar provides finer scale range resolution with smaller beam sizes than conventional microwave ranging systems, such as radio-wave detection and ranging (radar). Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

In radar or lidar, single-sideband modulation (SSB) or single-sideband suppressed-carrier modulation (SSB-SC) may be used to transmit information by radio or optical waves. SSB can avoid bandwidth increase of the original baseband signal and reduce the power wasted on a carrier, while increasing the device complexity at high cost. In-phase/quadrature (IQ) sampling (also called “complex sampling” or “quadrature sampling”) is a powerful technique commonly used in radar or lidar to retrieve full amplitude and phase information of a received signal. Optical IQ sampling often relies on having multiple detection and digitization channels and complex optical systems like optical hybrids.

Digital signal processing (DSP), the use of digital processing to perform a wide variety of signal processing operations, can provide simplicity without using complex circuits. A DSP system may include circuits configured to perform demodulation, decoding, and related tasks. These circuits are generally based on application-specific ICs (ASICs), field-programmable gate arrays (FPGAs) and programmable DSP devices. A DSP system can perform digital sampling (e.g., digital down conversion (DDC)), which is used in radio frequency signal processing and software-defined radios. The DSP system can achieve IQ sampling without complex circuits or devices and with only a single detection and digitization channel.

The conventional LIDAR sensor systems use Fast Fourier Transform (FFT) operations in Doppler and/or range processing. The computational cost of an FFT operation is approximately N log 2 N, where N is a transform size, but the FFT operation is made up of complex multiplication, addition, and/or subtraction. The peak to sidelobe ratio (PSLR) is a ratio between a returned signal of a mainlobe and that of a first sidelobe of a point signal. When the PLSR is increased, the background estimation and removal algorithm (or “inference removal” algorithm) can be less performant without negatively impacting system performance. There is a need for a mechanism to optimize Doppler and/or range processing in a lidar sensor system to reduce the computational cost and increase the performance.

When laser light illuminates a diffuse object, it may produce a random interference effect known as a speckle pattern or speckle broadening. If there is movement in the object, the speckles fluctuate in intensity. This speckle (broadening) effect may cause a random walk in phase/amplitude due to the random interference pattern on target, broaden Doppler (carrier) peak frequency, and/or cause SNR reduction by greater than 8 dB. There is a need for a mechanism to optimize a DSP system in a lidar sensor system to resolve the speckle broadening effect.

SUMMARY

Implementations of the present disclosure relate to a system and a method for a light detection and ranging (lidar) sensor system, and more particularly to a system and a method for range and Doppler processing in a lidar sensor system using Fast Walsh Hadamard Transform (FWHT; also referred to as “Fast Hadamard Transform” (FHT) or “Fast M-sequence Transform”).

In some implementations of the present disclosure, a light detection and ranging (LIDAR) system may include one or more processors and one or more computer-readable storage mediums storing instructions which, when executed by the one or more processors, cause the one or more processors to transmit an optical signal to an environment. The one or more processors may be configured to receive, from the environment, a returned optical signal in response to transmitting the optical signal. The one or more processors may be configured to generate, based on the returned optical signal, an electrical signal. The one or more processors may be configured to determine a Doppler frequency shift in the returned optical signal based on the electrical signal. The one or more processors may be configured to adjust the electrical signal using the Doppler frequency shift. The one or more processors may be configured to divide the adjusted electrical signal into a plurality of electrical signals. The one or more processors may be configured to determine a range of the returned optical signal by performing an operation on the plurality of electrical signals in parallel.

In some implementations of the present disclosure, an autonomous vehicle control system may include one or more processors and one or more computer-readable storage mediums. The mediums may store instructions which, when executed by the one or more processors, cause the one or more processors to transmit an optical signal to an environment. The one or more processors may be configured to receive, from the environment, a returned optical signal in response to transmitting the optical signal. The one or more processors may be configured to generate, based on the returned optical signal, an electrical signal. The one or more processors may be configured to determine a Doppler frequency shift in the returned optical signal based on the electrical signal. The one or more processors may be configured to adjust the electrical signal using the Doppler frequency shift. The one or more processors may be configured to divide the adjusted electrical signal into a plurality of electrical signals. The one or more processors may be configured to determine a range of the returned optical signal by performing an operation on the plurality of electrical signals in parallel. The one or more processors may be configured to control operation of a vehicle using the range of the returned optical signal.

In some implementations of the present disclosure, an autonomous vehicle may include at least one of a steering system or a braking system, and a vehicle controller including one or more processors. The one or more processors may be configured to transmit an optical signal to an environment. The one or more processors may be configured to receive, from the environment, a returned optical signal in response to transmitting the optical signal. The one or more processors may be configured to generate, based on the returned optical signal, an electrical signal. The one or more processors may be configured to determine a Doppler frequency shift in the returned optical signal based on the electrical signal. The one or more processors may be configured to adjust the electrical signal using the Doppler frequency shift. The one or more processors may be configured to divide the adjusted electrical signal into a plurality of electrical signals. The one or more processors may be configured to determine a range of the returned optical signal by performing an operation on the plurality of electrical signals in parallel. The one or more processors may be configured to control the at least one of the steering system or the braking system using the range of the returned optical signal.

In some implementations, a light detection and ranging (LIDAR) system may include one or more processors and one or more computer-readable storage mediums storing instructions which, when executed by the one or more processors, cause the one or more processors to transmit an optical signal to an environment. The one or more processors may be configured to receive, from the environment, a returned optical signal in response to transmitting the optical signal. The one or more processors may be configured to convert the returned optical signal into a plurality of digital signals. The one or more processors may be configured to simultaneously generate a plurality of electrical signals corresponding to the plurality of digital signals. The one or more processors may be configured to determine, based on the plurality of electrical signals, a plurality of Doppler peaks. The one or more processors may be configured to simultaneously adjust the plurality of electrical signals using the plurality of Doppler peaks. The one or more processors may be configured to determine, based on the adjusted plurality of electrical signals, a range of the returned optical signal.

In some implementations of the present disclosure, an autonomous vehicle control system may include one or more processors and one or more computer-readable storage mediums. The mediums may store instructions which, when executed by the one or more processors, cause the one or more processors to transmit an optical signal to an environment. The one or more processors may be configured to receive, from the environment, a returned optical signal in response to transmitting the optical signal. The one or more processors may be configured to convert the returned optical signal into a plurality of digital signals. The one or more processors may be configured to simultaneously generate a plurality of electrical signals corresponding to the plurality of digital signals. The one or more processors may be configured to determine, based on the plurality of electrical signals, a plurality of Doppler peaks. The one or more processors may be configured to simultaneously adjust the plurality of electrical signals using the plurality of Doppler peaks. The one or more processors may be configured to determine, based on the adjusted plurality of electrical signals, a range of the returned optical signal. The one or more processors may be configured to control operation of a vehicle using the range of the returned optical signal.

In some implementations of the present disclosure, an autonomous vehicle may include at least one of a steering system or a braking system, and a vehicle controller including one or more processors. The one or more processors may be configured to transmit an optical signal to an environment. The one or more processors may be configured to receive, from the environment, a returned optical signal in response to transmitting the optical signal. The one or more processors may be configured to convert the returned optical signal into a plurality of digital signals. The one or more processors may be configured to simultaneously generate a plurality of electrical signals corresponding to the plurality of digital signals. The one or more processors may be configured to determine, based on the plurality of electrical signals, a plurality of Doppler peaks. The one or more processors may be configured to simultaneously adjust the plurality of electrical signals using the plurality of Doppler peaks. The one or more processors may be configured to determine, based on the adjusted plurality of electrical signals, a range of the returned optical signal. The one or more processors may be configured to control the at least one of the steering system or the braking system using the range of the returned optical signal.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

DETAILED DESCRIPTION

According to certain aspects, implementations of the present disclosure relate to a system and a method for a light detection and ranging (lidar) sensor system, and more particularly to a system and a method for a lidar sensor system using Fast Walsh Hadamard Transform (FWHT; also referred to as "Fast Hadamard Transform" (FHT) or "Fast M-sequence Transform").

According to certain aspects, a light detection and ranging (LIDAR) system may include one or more processors and one or more computer-readable storage mediums storing instructions which, when executed by the one or more processors, cause the one or more processors to transmit an optical signal to an environment. The one or more processors may be configured to receive, from the environment, a returned optical signal in response to transmitting the optical signal. The one or more processors may be configured to generate, based on the returned optical signal, an electrical signal. The one or more processors may be configured to determine a Doppler frequency shift in the returned optical signal based on the electrical signal. The one or more processors may be configured to adjust the electrical signal using the Doppler frequency shift. The one or more processors may be configured to divide the adjusted electrical signal into a plurality of electrical signals. The one or more processors may be configured to determine a range of the returned optical signal by performing an operation on the plurality of electrical signals in parallel.

According to certain aspects, a LIDAR system may include one or more processors and one or more computer-readable storage mediums storing instructions which, when executed by the one or more processors, cause the one or more processors to transmit an optical signal to an environment. The one or more processors may be configured to receive, from the environment, a returned optical signal in response to transmitting the optical signal. The one or more processors may be configured to convert the returned optical signal into a plurality of digital signals. The one or more processors may be configured to simultaneously generate a plurality of electrical signals corresponding to the plurality of digital signals. The one or more processors may be configured to determine, based on the plurality of electrical signals, a plurality of Doppler peaks. The one or more processors may be configured to simultaneously adjust the plurality of electrical signals using the plurality of Doppler peaks. The one or more processors may be configured to determine, based on the adjusted plurality of electrical signals, a range of the returned optical signal.

1. System Environment for Autonomous Vehicles

Figure 1A:
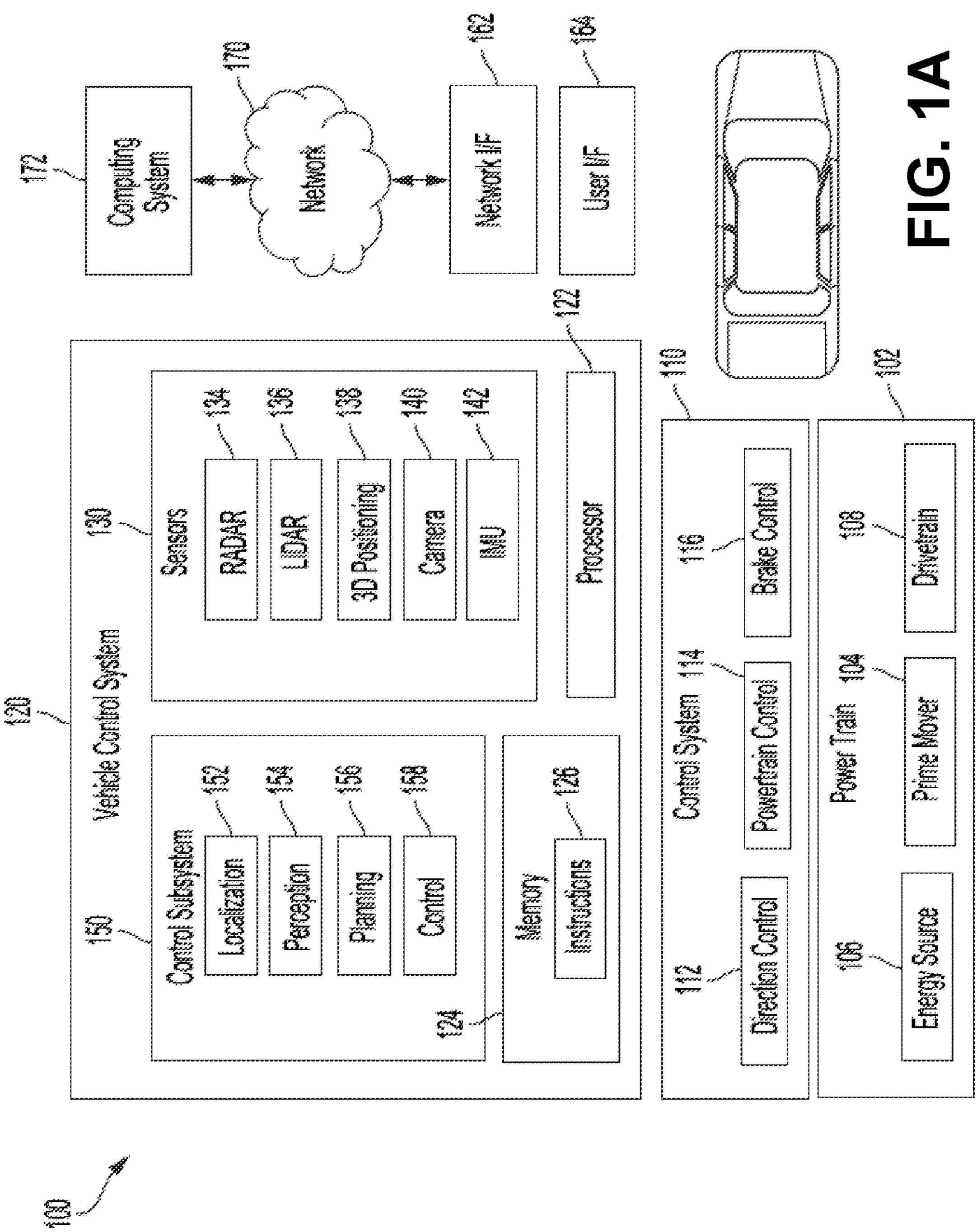
FIG. 1A is a block diagram illustrating an example of a system environment for autonomous vehicles according to some implementations.

FIG. 1A is a block diagram illustrating an example of a system environment for autonomous vehicles according to some implementations. FIG. 1A depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processor(s) can include, for example, graphics processing unit(s) ("GPU(s)")) and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1A can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received through (e.g., by way of) another computer or electronic device, e.g., through an app on a mobile device or through a web interface.

Moreover, the vehicle 110A may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 110A receives environmental and other data for use in autonomous control thereof. Data collected by the one or more sensors 130 can be uploaded to a computing system 172 via the network 170 for additional processing. A time stamp can be added to each instance of vehicle data prior to uploading. In some implementations, computing system 172 may have configuration similar to that of computing system 400 in FIG. 4. Additional processing of autonomous vehicle data by computing system 172 in accordance with many implementations is described with respect to FIG. 4.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 through network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

2. LIDAR for Automotive Applications

Figure 3A:
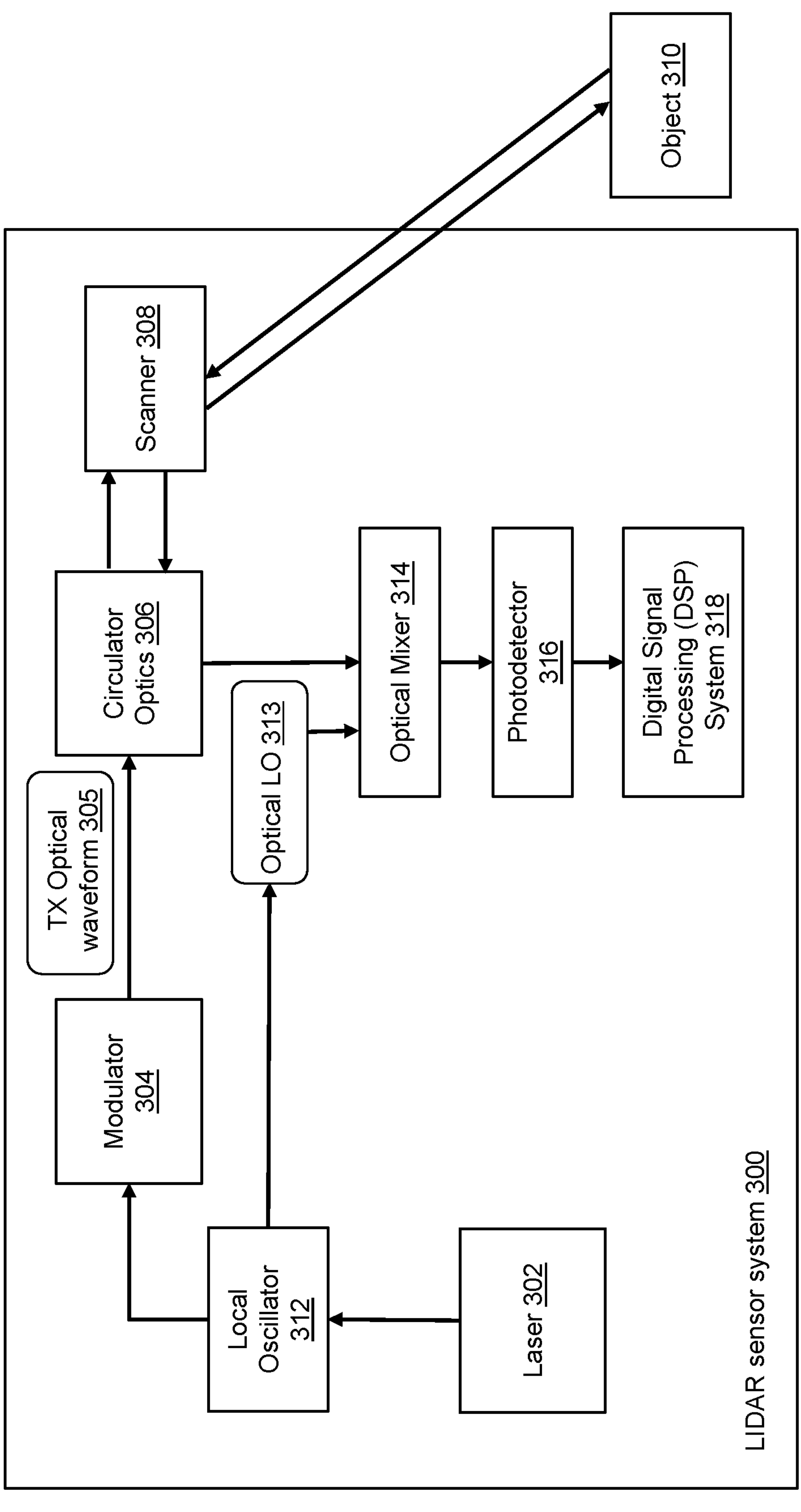
FIG. 3A is a block diagram illustrating an example of a lidar sensor system, according to some implementations.

A truck can include a LIDAR system (e.g., vehicle control system 120 in FIG. 1A, LIDAR sensor system 300 in FIG. 3A, among others described herein). In some implementations, the LIDAR sensor system 300 can use frequency modulation to encode an optical signal and scatter the encoded optical signal into free-space using optics. By detecting the frequency differences between the encoded optical signal and a returned signal reflected back from an object, the frequency modulated (FM) LIDAR sensor system can determine the location of the object and/or precisely measure the velocity of the object using the Doppler effect. In some implementations, an FM LIDAR sensor system may use a continuous wave (referred to as, "FMCW LIDAR") or a quasi-continuous wave (referred to as, "FMQW LIDAR"). In some implementations, the LIDAR sensor system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1A) of the FM or PM LIDAR sensor system a low amount (e.g., 10% or less) of the light that hit the object. In other instances, an object (e.g., a shiny road sign) may have a high reflectivity (e.g., above 10%), in that it reflects back to the sensors of the FM LIDAR sensor system a high amount of the light that hit the object.

Regardless of the object's reflectivity, an FM LIDAR sensor system may be able to detect (e.g., classify, recognize, discover, etc.) the object at greater distances (e.g., 2×) than a conventional LIDAR sensor system. For example, an FM LIDAR sensor system may detect a low reflectivity object beyond 300 meters, and a high reflectivity object beyond 400 meters.

To achieve such improvements in detection capability, the FM LIDAR sensor system may use sensors (e.g., sensors 130 in FIG. 1A). In some implementations, these sensors can be single photon sensitive, meaning that they can detect the smallest amount of light possible. While an FM LIDAR sensor system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5602 nm; and far infrared: 5602 nm-1,000,000 nm). By operating the FM or PM LIDAR sensor system in infrared wavelengths, the FM or PM LIDAR sensor system can broadcast stronger light pulses or light beams than conventional LIDAR sensor systems.

Thus, by detecting an object at greater distances, an FM LIDAR sensor system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR sensor system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR sensor systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR sensor system to determine distant or sparse data points as objects and/or track how those objects are moving over time. For example, an FM LIDAR sensor (e.g., sensors 130 in FIG. 1A) may only receive a few returns (e.g., hits) on an object that is 300 m away, but if those return give a velocity value of interest (e.g., moving towards the vehicle at >70 mph), then the FM LIDAR sensor system and/or the autonomous vehicle control system may determine respective weights to probabilities associated with the objects.

Faster identification and/or tracking of the FM LIDAR sensor system gives an autonomous vehicle control system more time to maneuver a vehicle. A better understanding of how fast objects are moving also allows the autonomous vehicle control system to plan a better reaction.

The FM LIDAR sensor system can have less static compared to conventional LIDAR sensor systems. That is, the conventional LIDAR sensor systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR sensor systems often need extra hardware, complex software, and/or more computational power to manage this effect.

In contrast, FM LIDAR sensor systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR sensor systems produce (e.g., generates, derives, etc.) more accurate data with less hardware or software requirements, enabling smoother driving.

The FM LIDAR sensor system can be easier to scale than conventional LIDAR sensor systems. As more self-driving vehicles (e.g., cars, commercial trucks, etc.) show up on the road, those powered by an FM LIDAR sensor system likely will not have to contend with interference issues from sensor crosstalk. Furthermore, an FM LIDAR sensor system uses less optical peak power than conventional LIDAR sensors. As such, some or all of the optical components for an FM LIDAR can be produced on a single chip, which produces its own benefits, as discussed herein.

3. Commercial Trucking

Figure 1B:
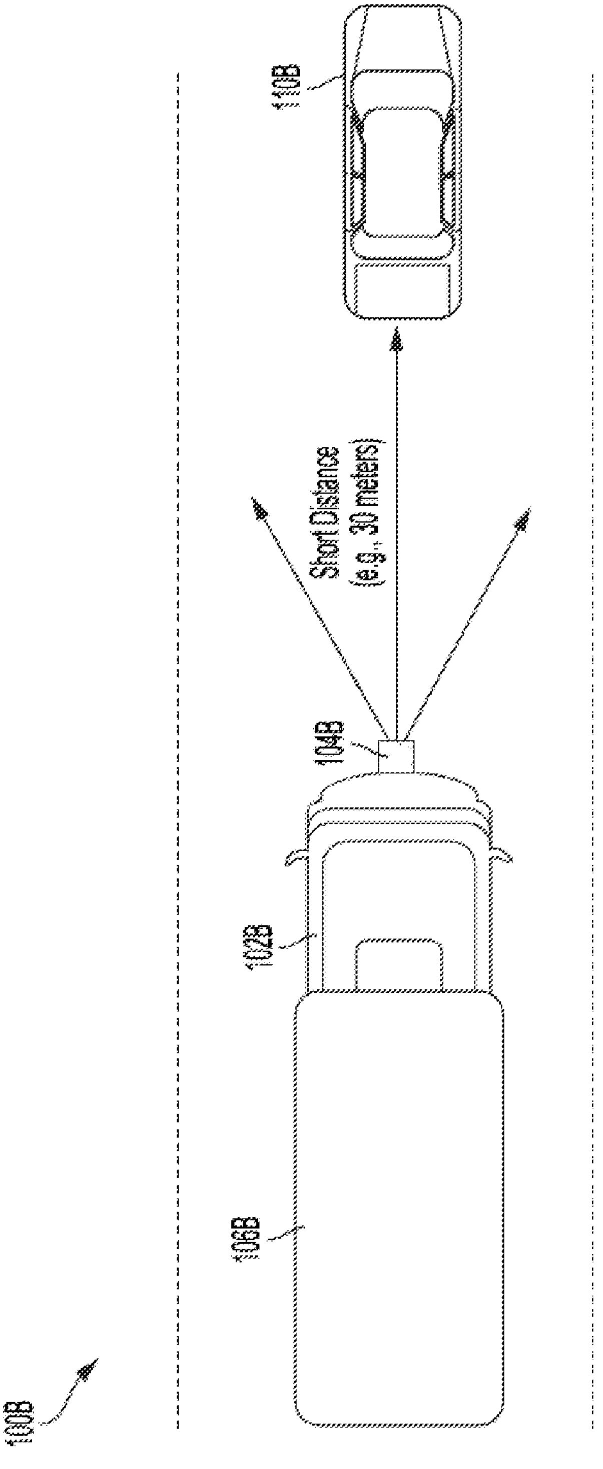
FIG. 1B is a block diagram illustrating an example of a system environment for autonomous commercial trucking vehicles according to some implementations.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or products. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a LIDAR sensor system 104B (e.g., an FM LIDAR sensor system, vehicle control system 120 in FIG. 1A, LIDAR sensor system 300 in FIG. 3A) for determining a distance to the object 110B and/or measuring the velocity of the object 110B. Although FIG. 1B shows that one LIDAR sensor system 104B is mounted on the front of the commercial truck 102B, the number of LIDAR sensor systems and the mounting area of the LIDAR sensor system on the commercial truck are not limited to a particular number or a particular area. The commercial truck 102B may include any number of LIDAR sensor systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR sensor system 104B in environment 100B may be configured to detect an object (e.g., another vehicle, a bicycle, a tree, street signs, potholes, etc.) at short distances (e.g., 30 meters or less) from the commercial truck 102B.

Figure 1C:
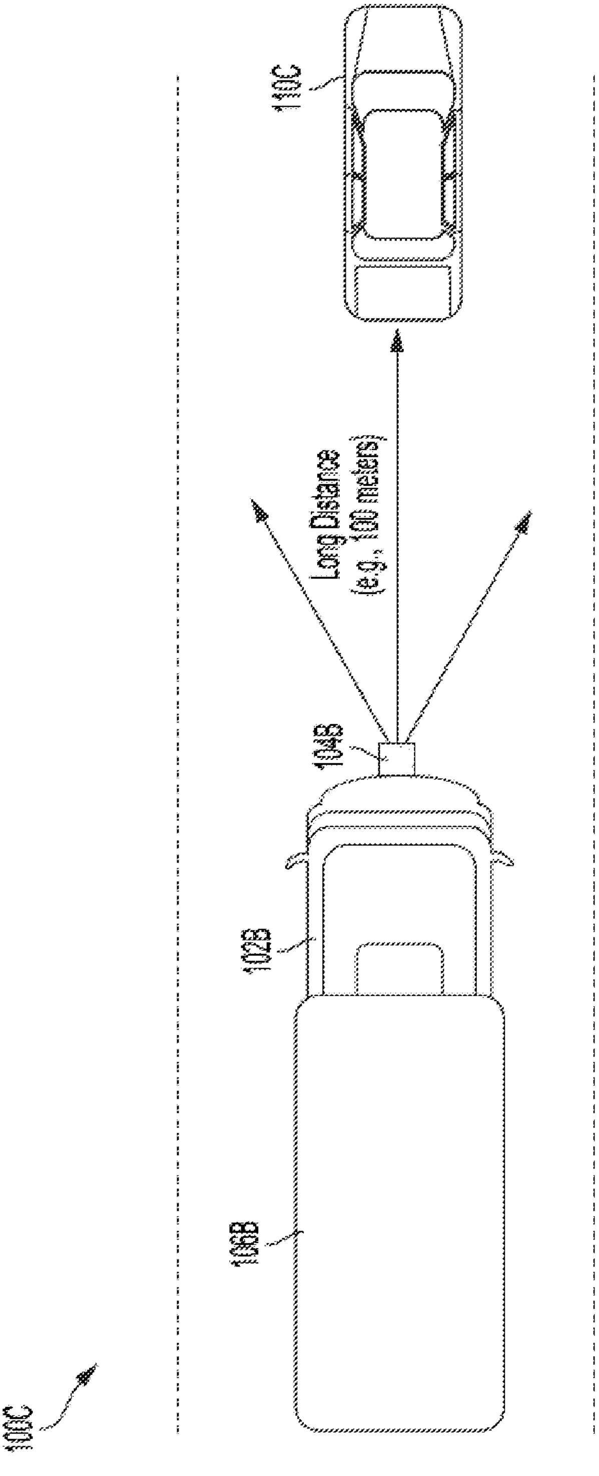
FIG. 1C is a block diagram illustrating an example of a system environment for autonomous commercial trucking vehicles according to some implementations.

FIG. 1C is a block diagram illustrating an example of a system environment for autonomous commercial trucking vehicles, according to some implementations. The environment 100C includes the same components (e.g., commercial truck 102B, cargo 106B, LIDAR sensor system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the LIDAR sensor system 104B in environment 100C may be configured to detect an object (e.g., another vehicle, a bicycle, a tree, street signs, potholes, etc.) at a distance (e.g., 100 meters) from the commercial truck 102B.

Figure 1D:
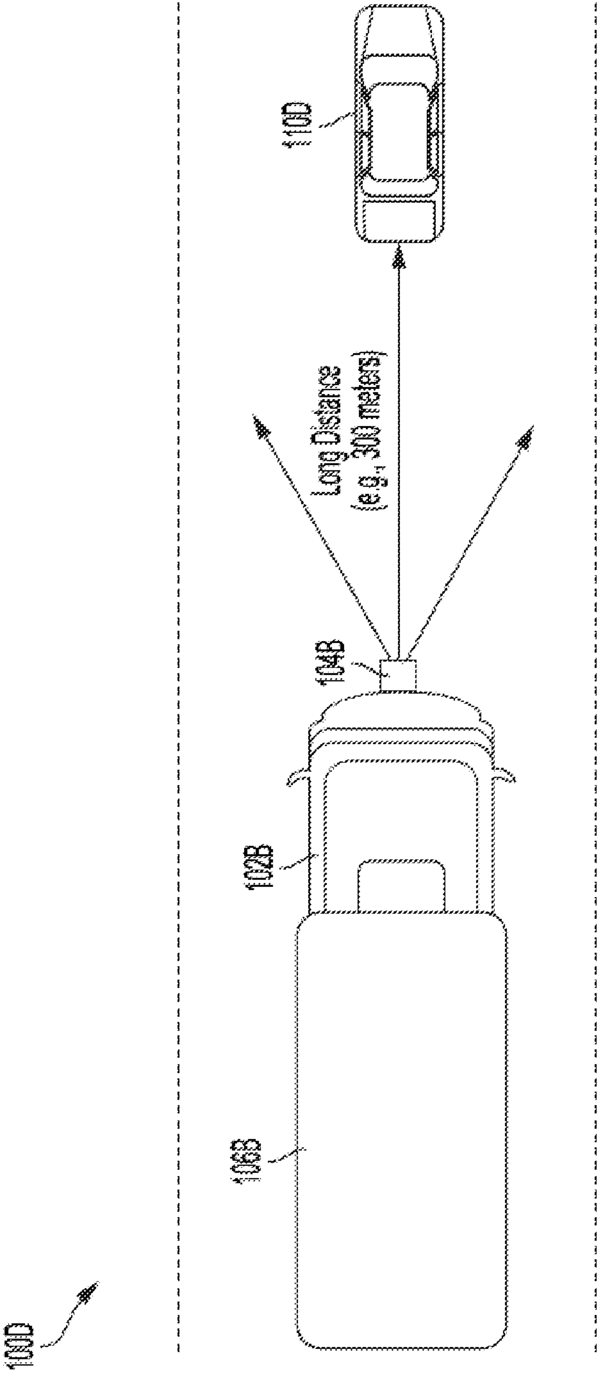
FIG. 1D is a block diagram illustrating an example of a system environment for autonomous commercial trucking vehicles according to some implementations.

FIG. 1D is a block diagram illustrating an example of a system environment for autonomous commercial trucking vehicles, according to some implementations. The environment 100D includes the same components (e.g., commercial truck 102B, cargo 106B, LIDAR sensor system 104B, etc.) that are included in environment 100B.

The environment 100D includes an object 110D (shown in FIG. 1D as another vehicle) that is within a distance range that is more than 150 meters from the commercial truck 102B. As shown, the LIDAR sensor system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR sensor systems (e.g., FMCW and/or FMQW systems) or PM LIDAR sensor systems are well-suited for commercial trucking applications due to the advantages described above. As a result, commercial trucks equipped with such systems may have an enhanced ability to move both people and goods across short or long distances. In various implementations, such FM or PM LIDAR sensor systems can be used in semi-autonomous applications, in which the commercial truck has a driver and some functions of the commercial truck are autonomously operated using the FM or PM LIDAR sensor system, or fully autonomous applications, in which the commercial truck is operated entirely by the FM or LIDAR sensor system, alone or in combination with other vehicle systems.

4. Measurement of Range Using Optical Phase-Encoded Signals

Figure 2A:
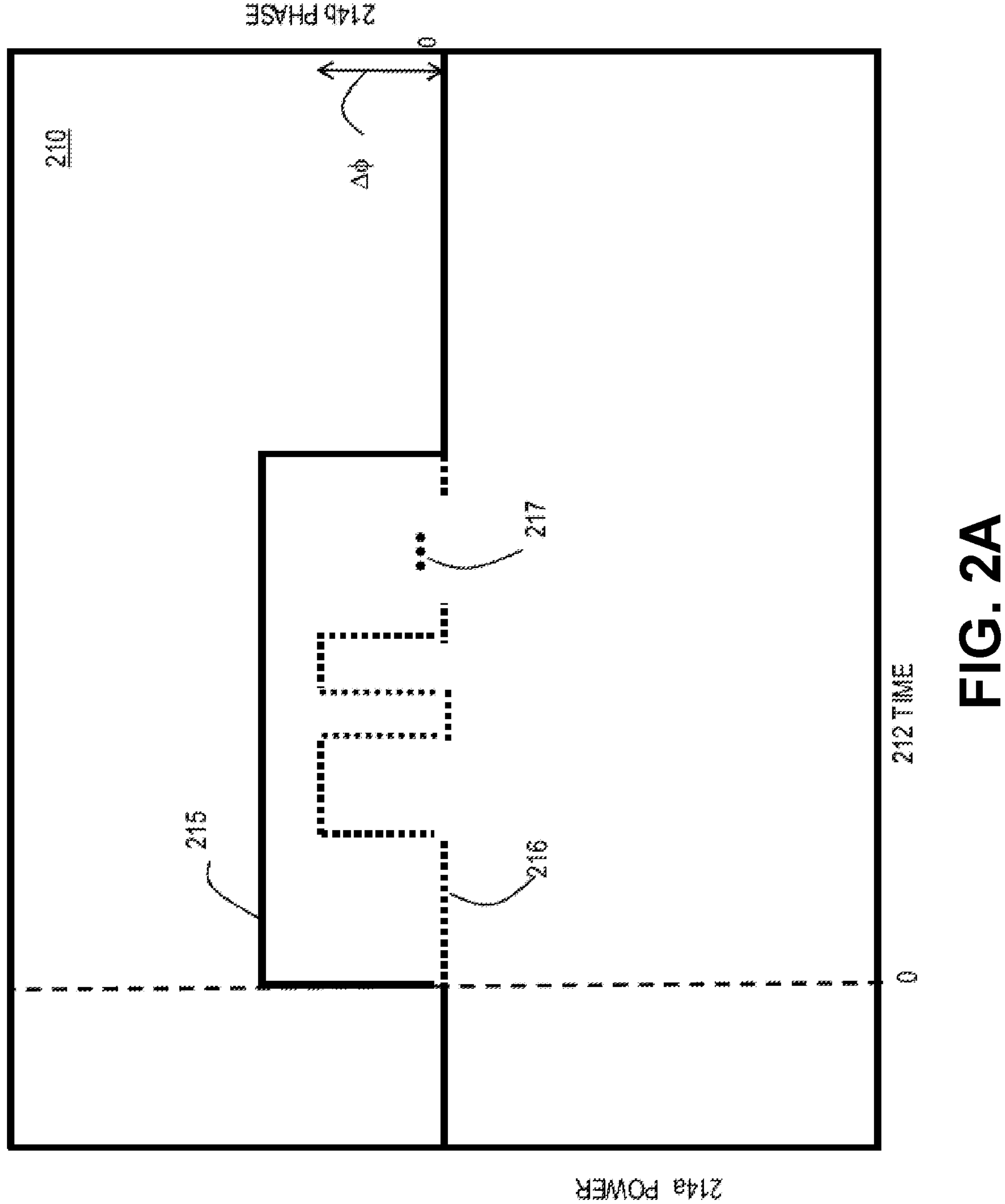
FIG. 2A is a schematic graph that illustrates an example transmitted optical phase-encoded signal for measurement of range, according to some implementations.

FIG. 2A is a schematic graph 210 that illustrates an example transmitted optical phase-encoded signal for measurement of range, according to an embodiment. The horizontal axis 212 indicates time in arbitrary units from a start time at zero. The left vertical axis 214*a* indicates power in arbitrary units during a transmitted signal; and the right vertical axis 214*b* indicates phase of the transmitted signal in arbitrary units. To simply illustrate the technology of phase-encoded LIDAR, binary phase encoding is demonstrated. Trace 215 indicates the power relative to the left axis 214*a* and is constant during the transmitted signal and falls to zero outside the transmitted signal. Dotted trace 216 indicates phase of the signal relative to a continuous wave signal.

As can be seen, the trace is in phase with a carrier (phase=0) for part of the transmitted signal and then changes by $\Delta\varphi$ (phase=$\Delta\varphi$) for short time intervals, switching back and forth between the two phase values repeatedly over the transmitted signal as indicated by the ellipsis 217. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\varphi$*{0, 1, 2 and 3}, which, for $\Delta\varphi=\pi/2$ (90 degrees), equals {0, $\pi/2$, n and $3\pi/2$}, respectively; and thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave) as illustrated in FIG. 2A. The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself. Since this scheme depends on the difference between successive phases, it is termed differential phase-shift keying (DPSK). DPSK can be significantly simpler to implement than ordinary PSK, since there is no need for the demodulator to have a copy of the reference signal to determine the exact phase of the received signal (it is a non-coherent scheme).

For optical ranging applications, the carrier frequency is an optical frequency $f_c$ and a RF $f_r$ is modulated onto the optical carrier. The number N and duration t of symbols are selected to achieve the desired range accuracy and resolution. The pattern of symbols is selected to be distinguishable from other sources of coded signals and noise. Thus, a strong correlation between the transmitted and returned signal is a strong indication of a reflected or backscattered signal. The transmitted signal is made up of one or more blocks of symbols, where each block is sufficiently long to provide strong correlation with a reflected or backscattered return even in the presence of noise. In the following discussion, it is assumed that the transmitted signal is made up of M blocks of N symbols per block, where M and N are non-negative integers.

Figures 2B, 2C:
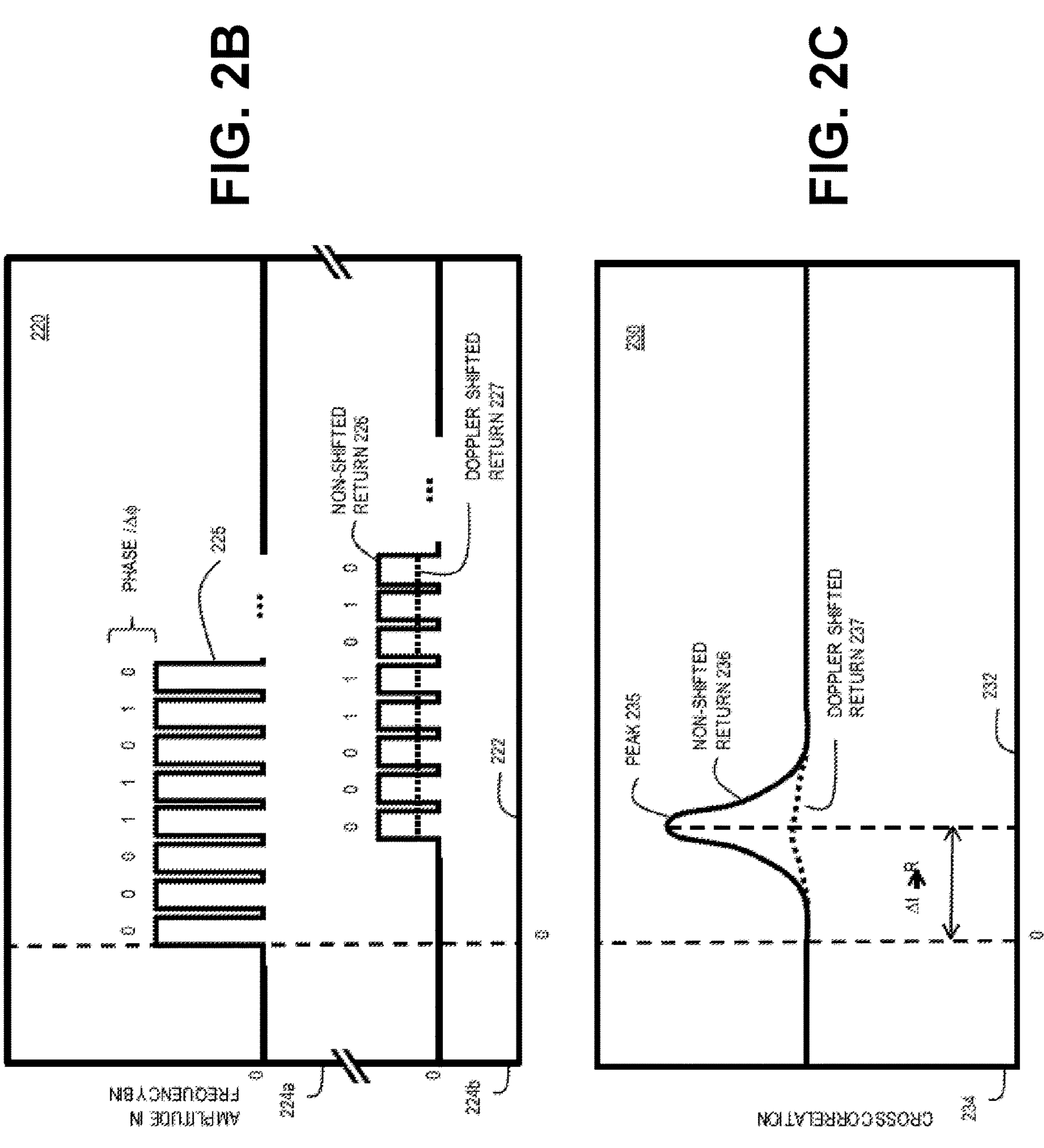
FIG. 2B is a schematic graph that illustrates the example transmitted signal of FIG. 2A as a series of binary digits along with returned optical signals for measurement of range, according to some implementations.
FIG. 2C is a schematic graph that illustrates example cross-correlations of a reference signal with two returned signals, according to some implementations.

FIG. 2B is a schematic graph 220 that illustrates the example transmitted signal of FIG. 2A as a series of binary digits along with returned optical signals for measurement of range, according to an embodiment. The horizontal axis 222 indicates time in arbitrary units after a start time at zero. The vertical axis 224*a* indicates amplitude of an optical transmitted signal at frequency $f_c+f_r$ in arbitrary units relative to zero. The vertical axis 224*b* indicates amplitude of an optical returned signal at frequency $f_c+f_r$ in arbitrary units relative to zero, and is offset from axis 224*a* to separate traces. Trace 225 represents a transmitted signal of M*N binary symbols, with phase changes as shown in FIG. 2A to produce a code starting with 00011010 and continuing as indicated by ellipsis. Trace 226 represents an idealized (noiseless) return signal that is scattered from an object that is not moving (and thus the return is not Doppler shifted). The amplitude is reduced, but the code 00011010 is recognizable. Trace 227 represents an idealized (noiseless) return signal that is scattered from an object that is moving and is therefore Doppler shifted. The return is not at the proper optical frequency $f_c+f_r$ and is not well detected in the expected frequency band, so the amplitude is diminished.

The observed frequency f' of the return differs from the correct frequency $f=f_c+f_r$ of the return by the Doppler effect given by Equation 1.

$$f' = \frac{(c+v_o)}{(c+v_s)} f \qquad \text{(Equation 1)}$$

Where c is the speed of light in the medium. Note that the two frequencies are the same if the observer and source are moving at the same speed in the same direction on the vector between the two. The difference between the two frequencies, $\Delta f=f'-f$, is the Doppler shift, $\Delta f_D$, which causes problems for the range measurement, and is given by Equation 2.

$$\Delta f_D = \left[\frac{(c+v_o)}{(c+v_s)} - 1\right] f \qquad \text{(Equation 2)}$$

Note that the magnitude of the error increases with the frequency f of the signal. Note that for a stationary LIDAR system ($v_o$=0), for an object moving at 10 meters a second ($v_o$=10), and visible light of frequency about 500 THz, then the size of the error is on the order of 16 megahertz (MHz, 1 MHz=$10^6$ hertz, Hz, 1 Hz=1 cycle per second). In various embodiments described below, the Doppler shift error is detected and used to process the data for the calculation of range.

FIG. 2C is a schematic graph 230 that illustrates example cross-correlations of the transmitted signal with two returned signals, according to an embodiment. In phase coded ranging, the arrival of the phase coded reflection is detected in the return by cross correlating the transmitted signal or other reference signal with the returned signal, implemented practically by cross correlating the code for a RF signal with an electrical signal from an optical detector using heterodyne detection and thus down-mixing back to the RF band. In some implementations, this may include correlating a sequence of phases (or phase changes) of a particular frequency in a return signal with that in the transmitted signal. The horizontal axis 232 indicates a lag time in arbitrary units applied to the coded signal before performing the cross correlation calculation with the returned signal. The vertical axis 234 indicates amplitude of the cross correlation computation. Cross correlation for any one lag is computed by convolving the two traces, i.e., multiplying corresponding values in the two traces and summing over all points in the trace, and then repeating for each time lag. Alternatively, the cross correlation can be accomplished by a multiplication of the Fourier transforms of each the two traces followed by an inverse Fourier transform. Efficient hardware and software implementations for a Fast Fourier transform (FFT) are widely available for both forward and inverse Fourier transforms. More precise mathematical expression for performing the cross correlation are provided for some example embodiments, below. In some implementations, the Doppler peak and/or its shift ($\Delta f_D$) can be used to correct the correlation computation and determine the correct range. This may be accomplished with an autocorrelation computation, e.g., using the computational efficiencies of a FFT and inverse FFT.

In some implementations, a long code, of duration $D=(M*N)*\tau$, may be encoded onto the transmitted light, and a return signal of the same length in time can collected. Both the code and signal are broken into M shorter blocks of length N so that the correlation can be conducted several times on the same data stream and the results averaged to improve signal to noise ratio (SNR). Families of good binary spreading sequences with minimal auto-correlation sidelobes for communication systems and radar and LIDAR systems such as so-called "maximal-length sequences (m-sequences)" can provide the codes used for phase modulation of each block of the M blocks.

Note that the cross correlation computation is typically done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

Trace 236 represents cross correlation with an idealized (noiseless) return signal that is reflected from an object that is not moving (and thus the return is not Doppler shifted). A peak occurs at a time $\Delta t$ after the start of the transmitted signal. This indicates that the returned signal includes a version of the transmitted phase code beginning at the time $\Delta t$. The range R to the reflecting (or backscattering) object is computed from the two way travel time delay based on the speed of light c in the medium, as given by Equation 3.

$$R = c * \Delta t/2 \quad \text{(Equation 3)}$$

Figures 2D, 2E:
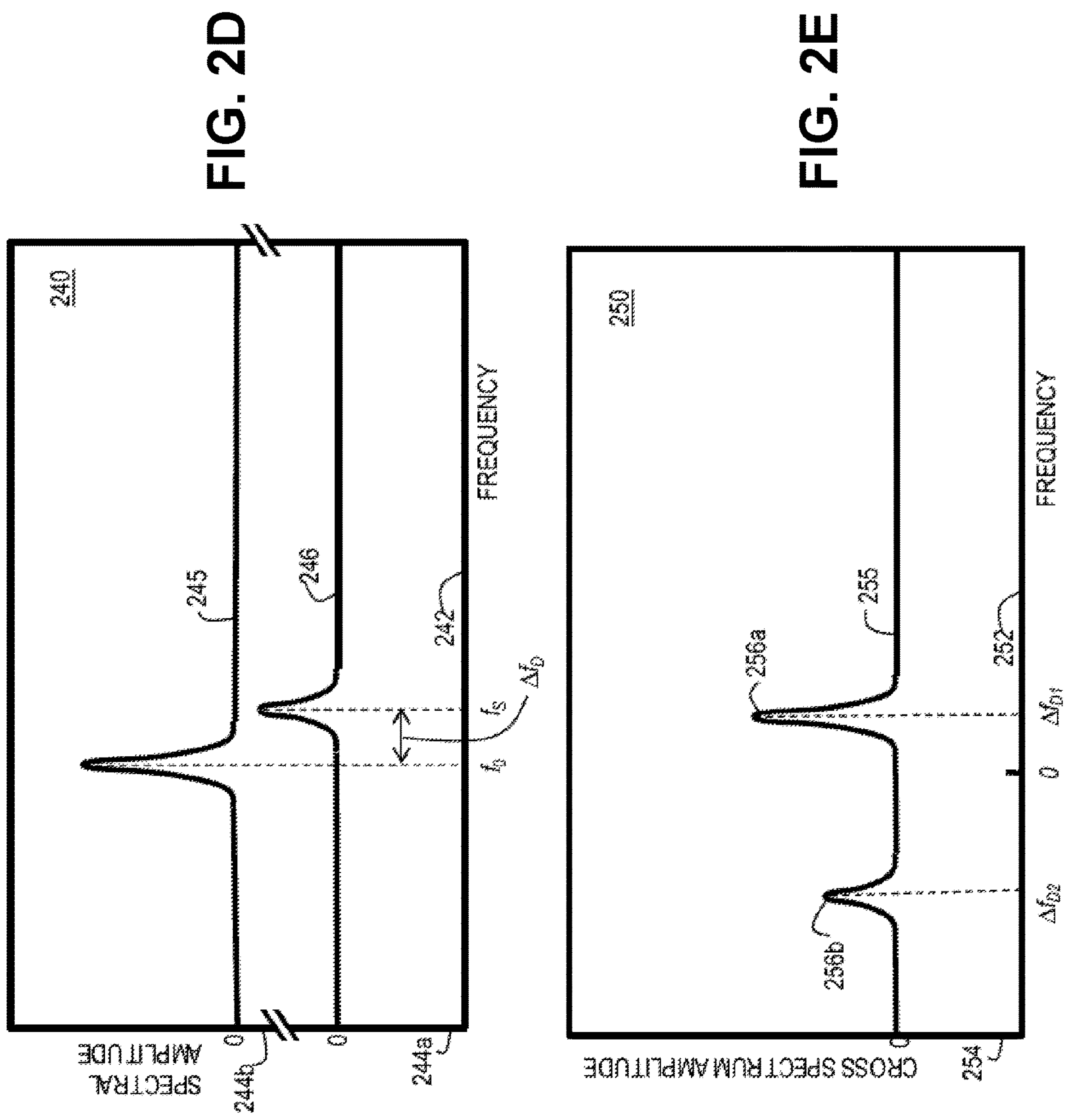
FIG. 2D is a schematic graph that illustrates an example spectrum of the reference signal and an example spectrum of a Doppler shifted return signal, according to some implementations.
FIG. 2E is a schematic graph that illustrates an example cross-spectrum of phase components of a Doppler shifted return signal, according to some implementations.

According to various embodiments described in more detail below, the Doppler shift is determined in the electrical processing of the returned signal; and the Doppler shift is used to correct the cross correlation calculation. Thus, a peak is more readily found and range can be more readily determined. FIG. 2D is a schematic graph 240 that illustrates an example spectrum of the transmitted signal and an example spectrum of a Doppler shifted return signal, according to an embodiment. The horizontal axis 242 indicates RF frequency offset from an optical carrier fc in arbitrary units. The vertical axis 244*a* indicates amplitude of a particular narrow frequency bin, also called spectral density, in arbitrary units relative to zero. The vertical axis 244*b* indicates spectral density in arbitrary units relative to zero, and is offset from axis 244*a* to separate traces. Trace 245 represents a transmitted signal; and a peak occurs at the proper RF $f_0$. Trace 246 represents an idealized (noiseless) return signal that is backscatter from an object that is moving and is therefore Doppler shifted. The return does not have a peak at the proper RF $f_0$; but, instead, is blue shifted by $\Delta f_D$ to a shifted frequency $f_S$.

In some Doppler compensation embodiments, rather than finding $\Delta f_D$ by taking the spectrum of both transmitted and returned signals and searching for peaks in each, then subtracting the frequencies of corresponding peaks, as illustrated in FIG. 2D, it is more efficient to take the cross spectrum of the in-phase and quadrature component of the down-mixed returned signal in the RF band. FIG. 2E is a schematic graph 250 that illustrates an example cross-spectrum, according to an embodiment. The horizontal axis 252 indicates frequency shift in arbitrary units relative to the reference spectrum; and the vertical axis 254 indicates amplitude of the cross spectrum in arbitrary units relative to zero. Trace 255 represents a cross spectrum with an idealized (noiseless) return signal generated by one object moving toward the LIDAR system (blue shift of $\Delta f_{D1}=\Delta f_D$ in FIG. 2D) and a second object moving away from the LIDAR system (red shift of $\Delta f_{D2}$). A peak occurs when one of the components is blue shifted $\Delta f_{D1}$; and another peak occurs when one of the components is red shifted $\Delta f_{D2}$. Thus, the Doppler shifts are determined. These shifts can be used to determine a velocity of approach of objects in the vicinity of the LIDAR, as can be critical for collision avoidance applications.

As described in more detail below, the Doppler shift(s) detected in the cross spectrum are used to correct the cross correlation so that the peak 235 is apparent in the Doppler compensated Doppler shifted return at lag $\Delta t$, and range R can be determined. The information needed to determine and compensate for Doppler shifts is either not collected or not used in prior phase-encoded LIDAR systems.

5. A Lidar System Using a Digital Signal Processing (DSP)

Figure 3B:
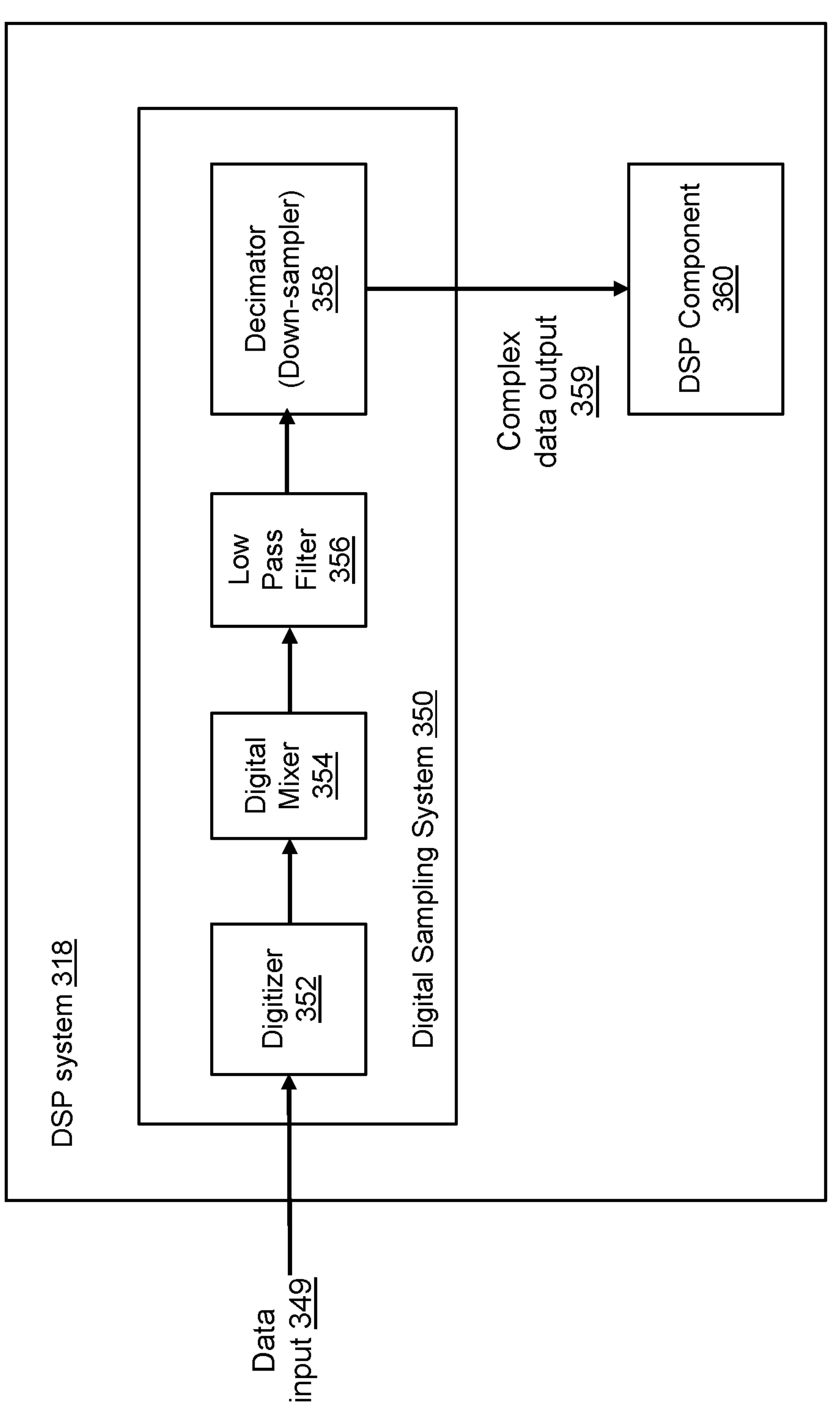
FIG. 3B is a block diagram illustrating an example of a digital signal processing (DSP) system in a lidar sensor system, according to some implementations.

FIG. 3A is a block diagram illustrating an example of a lidar sensor system 300, according to some implementations. The lidar sensor system 300 may include a laser source 302, a local oscillator 312, a modulator 304 (e.g., optical modulator), circulator optics 306, a scanner 308, an optical mixer 314, one or more detectors 316 (e.g., a pair of detectors), and a DSP system 318. FIG. 3B is a block diagram illustrating an example of the DSP system 318 in a lidar sensor system, according to some implementations. The DSP system 318 may include a digital sampling system 350 and other DSP components 360. The digital sampling system 350 may include a digitizer 352 (e.g., analog-to-digital converter (ADC)), a digital mixer 354 (e.g., a direct digital synthesizer (DDS), digital multipliers), a low pass filter 356, and a down-sampler 358. In some implementations, DSP system 318 may include circuits or one or more processors (e.g., processor 410 in FIG. 4) configured to perform demodulation, decoding, and related tasks. These circuits may be generally based on application-specific ICs (ASICs), field-programmable gate arrays (FPGAs) and programmable DSP devices.

Referring to FIG. 3A, the laser 302 may generate a beam which is oscillated by the local oscillator 312 to output an optical LO signal. In some implementations, the modulator 304 may determine a frequency offset (fo) between a transmit (TX) optical signal and the optical LO signal, generate an optical signal with its frequency shifted from the LO frequency by the frequency offset (fo), and perform modulation (e.g., IQ modulation) of the frequency-shifted optical signal (hereinafter referred to as "$f_o$-shifted waveform") based on a data signal (e.g., I/Q data signal) to generate a transmit (TX) optical waveform 305. In some implementations, the modulator 304 may generate a $f_o$-shifted waveform using a plurality of methods. The methods may include (1) optical single-sideband generation using a nested Mach-Zehnder electro-optic modulator, (2) serrodyne shifting with an electro-optic modulator, (3) optical phase-lock loop with two separate lasers, (4) optical injection locking with two separate lasers, or (5) using acousto-optic modulators.

The circulator optics 306 may receive the TX optical waveform 305, which is input to the scanner 308 as a TX signal. The TX signal may be transmitted through the scanner 308 to illuminate an object 310 (or an area of interest). The scanner 308 may receive a return optical signal reflected by the object 310 as a receive (RX) optical signal. In some implementations, the optical mixer 314 may mix the RX optical signal with an optical LO signal 313 to produce an optical signal, which may be then detected by the detector 316 and further delivered to the digital sampling system 350 of the DSP system 318 as analog data input 349 (see FIG. 3B).

Referring to FIG. 3B, the digitizer 352 of the digital sampling system 350 may digitize the analog data input to output a digital signal of interest. In some implementations, the digital signal of interest may include strictly positive frequency content because the RX optical signal may have a frequency range that has been shifted by the frequency offset ($f_o$) from the LO frequency. The digital mixer 354 of the digital sampling system 350 (e.g., DDC) may extract a full complex signal (e.g., I/Q components) from the digital signal by digitally mixing the digital signal to produce I data and Q data and recombine the I/Q data into a complex signal (not shown). In some implementations, the lidar sensor system (e.g., lidar sensor system 300) may mix the RX optical signal with an LO signal using the optical mixer 314 to produce an optical signal, which may be then detected by one or more detectors 316 (e.g., a pair of balanced detectors) and digitized by a digitizer 352 (e.g., ADC), producing a digital signal of interest. The resulting digital signal of interest may include strictly positive frequency content because the RX optical signal may have a frequency range that has been shifted by the frequency offset ($f_o$) from the LO frequency.

Referring to FIG. 3B, the digital sampling system 350 of the lidar sensor system 300 may extract a full complex signal (e.g., I/Q components) from the digital signal. The digital sampling system 350 may digitally mix the digital signal to produce I data and Q data and recombine the I/Q data into a complex signal. If s(t) and s'(t) denote the original digital signal and the complex signal, respectively, and I(t) and Q(t) denote the I data and Q data, respectively, the digital sampling system 350 may perform the step of generating the complex signal s'(t) according to the following equations:

$$I(t) = LP[\sin(2\pi f_0 t) \times s(t)] \quad \text{(Equation 4)}$$

$$Q(t) = -1 \times LP[\cos\ \cos(2\pi f_0 t) \times s(t)] \quad \text{(Equation 5)}$$

$$s'(t) = I(t) + 1jQ(t) \quad \text{(Equation 6)}$$

where 1j is the imaginary unit, $f_o$ is the frequency offset of the TX optical waveform, LP[ ] is a low pass filtering (LPF) operation (e.g., LPF operation performed by the low pass filter 356). After performing this step, the lidar sensor system may deliver the s'(t) signal to another DSP system (e.g., DSP component 360). The DSP system may bandpass filtered (e.g., by a bandpass filter) and/or down-sample or decimate (e.g., by down-sampler 358) the s'(t) signal as dictated by signal processing needs.

Referring to FIG. 3B, if s(t) and s'(t) denote the original digital signal and the complex signal, respectively, and I(t) and Q(t) denote the I data and Q data, respectively, the digital sampling system 350 may perform the step of generating the complex signal s'(t) according to Equation 4 to Equation 6. For example, the digital mixer 354 may digitally mix the digital signal s(t) based on the frequency offset $f_o$ to generate I data and Q data according to Equation 4 and Equation 5. The low pass filter 356 may further process the I data and Q data to eliminate a high-frequency component. The down-sampler (or decimator) 358 may down-sample (or decimate) the output of the low pass filter 356 to reduce the sample rate of the I data and Q data. After performing LPF and/or down-sampling, The DDC system 350 may recombine the I/Q data into the complex signal s'(t) and further deliver the s'(t) signal 359 to the another DSP system 360. The DSP system 360 may perform further processing (e.g., bandpass filtering and/or down-sampling) on the s'(t) signal as dictated by signal processing needs.

Figure 4:
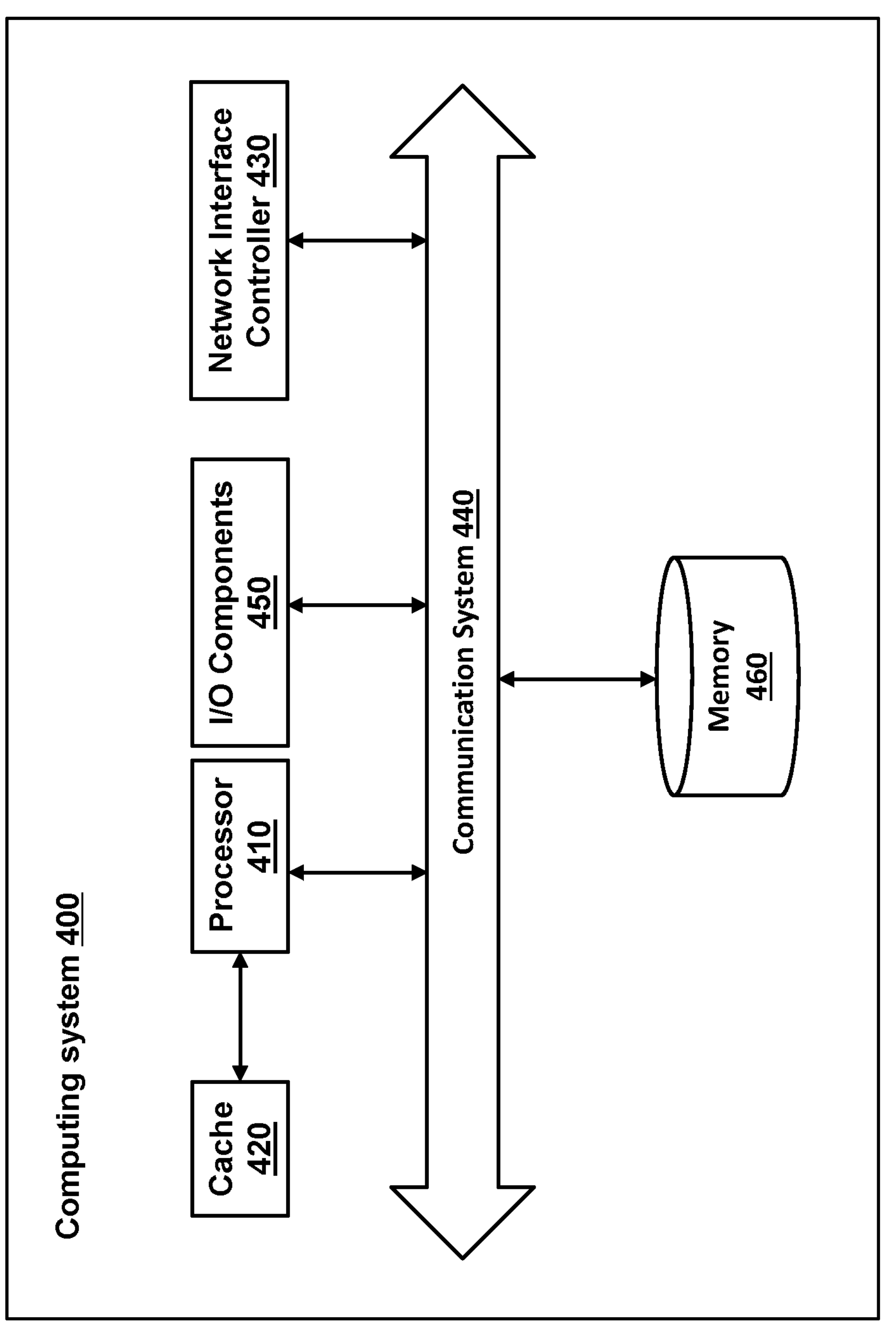
FIG. 4 is a block diagram illustrating an example of a computing system according to some implementations.

FIG. 4 is a block diagram illustrating an example of a computing system according to some implementations. Referring to FIG. 4, the illustrated example computing system 400 includes one or more processors 410 in communication, via a communication system 440 (e.g., bus), with memory 460, at least one network interface controller 430 with network interface port for connection to a network (not shown), and other components, e.g., an input/output ("I/O") components interface 450 connecting to a display (not illustrated) and an input device (not illustrated). Generally, the processor(s) 410 will execute instructions (or computer programs) received from memory. The processor(s) 410 illustrated incorporate, or are directly connected to, cache memory 420. In some instances, instructions are read from memory 460 into the cache memory 420 and executed by the processor(s) 410 from the cache memory 420.

In more detail, the processor(s) 410 may be any logic circuitry that processes instructions, e.g., instructions fetched from the memory 460 or cache 420. In some implementations, the processor(s) 410 are microprocessor units or special purpose processors. The computing device 400 may be based on any processor, or set of processors, capable of operating as described herein. The processor(s) 410 may be single core or multi-core processor(s). The processor(s) 410 may be multiple distinct processors.

The memory 460 may be any device suitable for storing computer readable data. The memory 460 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 400 may have any number of memory devices as the memory 460.

The cache memory 420 is generally a form of computer memory placed in close proximity to the processor(s) 410 for fast read times. In some implementations, the cache memory 420 is part of, or on the same chip as, the processor(s) 410. In some implementations, there are multiple levels of cache 420, e.g., L2 and L3 cache layers.

The network interface controller 430 manages data exchanges via the network interface (sometimes referred to as network interface ports). The network interface controller 430 handles the physical and data link layers of the OSI model for network communication. In some implementations, some of the network interface controller's tasks are handled by one or more of the processor(s) 410. In some implementations, the network interface controller 430 is part of a processor 410. In some implementations, a computing system 400 has multiple network interfaces controlled by a single controller 430. In some implementations, a computing system 400 has multiple network interface controllers 430. In some implementations, each network interface is a connection point for a physical network link (e.g., a cat-5 Ethernet link). In some implementations, the network interface controller 430 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 430 implements one or more network protocols such as Ethernet. Generally, a computing device 400 exchanges data with other computing devices via physical or wireless links through a network interface. The network interface may link directly to another device or to another device via an intermediary device, e.g., a network device such as a hub, a bridge, a switch, or a router, connecting the computing device 400 to a data network such as the Internet.

The computing system 400 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 400 may include an interface (e.g., a universal serial bus (USB) interface) for connecting input devices, output devices, or additional memory devices (e.g., portable flash drive or external media drive). In some implementations, a computing device 400 includes an additional device such as a co-processor, e.g., a math co-processor can assist the processor 410 with high precision or complex calculations.

6. A Lidar System Using Fast Hadamard Transform (FHT)

In one aspect, a LIDAR sensor system may use Fast Fourier Transform (FFT) operations in Doppler and/or range processing. The computational cost of an FFT operation is approximately N log 2 N, where N is a transform size, but the FFT operation is made up of complex multiplication, addition, and/or subtraction. The peak to sidelobe ratio (PSLR) is a ratio between a returned signal of a mainlobe and that of a first sidelobe of a point signal. When the PLSR is increased, the interference removal algorithm can be less performant without negatively impacting system performance. There is a need for a mechanism to optimize Doppler and/or range processing in a lidar sensor system to reduce the computational cost and increase the performance.

To solve this problem, in some implementations, a coherent LIDAR system can provide a pipeline structure to perform modulation and signal processing to process Fast Hadamard Transform (FHT) or Fast M-Sequence Transform. This modulation and signal processing pipeline can allow a DSP system to perform efficient coherent lidar signal processing and utilize the autocorrelation properties of M-sequences, thereby achieving improved PSLR.

In some implementations, a coherent LIDAR system can optimize FHT processing for single instruction multiple data (SIMD) processors. In some implementations, the coherent LIDAR system can perform a method of binary modulated coherent LIDAR processing with FHT (referred to as "binary modulated FHT processing method") to improve M-Sequence correlation. For example, the system can resample $2^{(N-1)}$ length m-sequences to be of length $2^N$ for efficient computation and optimal PSLR and/or autocorrelation. The binary modulated FHT processing method can use permutations and a FHT to implement a correlation of maximal length sequence (M-sequence) encoded lidar returns. The binary modulated FHT processing method can provide improved computational efficiency and improved PSLR performance.

In some implementations, the binary modulated FHT processing method (e.g., binary modulated FHT processing algorithm) can be optimally implemented for SIMD processors, resulting in increased computational efficiency (that may be dependent on the SIMD parallelization capability of the processor). A scalar (non-SIMD optimized) version of the method/algorithm can use N $\log_2$ N operations. In some implementations, the SIMD processor can perform R adds or subtracts in parallel (R is a positive integer) and can permute a vector of length R in a single operation, so that the binary modulated FHT processing algorithm can perform as shown in Table 1.

TABLE 1

| Number of Operations in FHT Processing | | | |
|---|---|---|---|
| Operation Type | Vector Adds/ Subtracts | Vector Permute | Scalar Reorder |
| Number of Operations | $\frac{N}{R}\log_2(N)$ | $\left(\left\lfloor\frac{\log_2(N)-\epsilon}{\log_2(R)}\right\rfloor+1\right)\cdot\left(\log_2(N)-\left\lfloor\frac{\log_2(N)-\epsilon}{\log_2(R)}\right\rfloor\right)$ | $N\left\lfloor\frac{\log_2(N)-\epsilon}{\log_2(R)}\right\rfloor$ |

In Table 1, N is a transform size, R is an SIMD parallelization capability, and $\epsilon$ is an infinitesimal. The binary modulated FHT processing method can reduce and/or divide the FHT processing into stages of permutations and adds/subtracts. For each stage (among $\log_2 N$ stages), the method can (1) construct a vector A and a vector B (e.g., by performing a reorder or permutation operation) and then (2) perform add (e.g., A+B) and subtract (e.g., A−B). Once the method performs add and subtract $\log_2 N$ times, the FHT transform can be completed. The method may not use the same permutation to construct A and B for each stage.

In some implementations, the parallelism for SIMD processors may be limited. For example, with a transform of size 2048, the method can construct A and B vectors of length 1024. If the SIMD (parallelization) capabilities of a system only allow for vector operations of length 32, then the method can perform 1024/32=32 adds and 1024/32=32 subtracts instead. The bulk of the computation can result from the fact that the re-ordering operation (constructing A and B) is limited by these SIMD parallelization capabilities. If the SIMD processors support permuting a vector of length 32 (R=32), then after $\log_2 R$ stages the method may perform a brute force scalar reorder instead. Due to these limitations, a pipeline for FHT processing may be constructed as a series of ideally optimized smaller FHT arrays followed by a scalar re-order. Additionally, since the FWHT is a real linear transformation, the real and imaginary inputs can be processed separately and combined at the end without incurring computation overhead. This means that to maximize the SIMD parallelization (e.g., R), real data types can be utilized.

In some implementations, a LIDAR system can provide a pipeline structure for improved PSLR (e.g., range PSLR, Doppler PSLR), improved peak fitting bias, and improved compute utilization. The pipeline structure can increase performance in peak fitting bias, and reduce compute resources compared to the conventional LIDAR system. In some implementations, the pipeline structure may be used to perform IQ processing and/or continuous wave (CW) processing.

In some implementations, a DSP system can implement a pipeline structure for Doppler and range processing. The pipeline structure may include pipelines for (1) pre-processing, (2) Doppler processing, and/or (3) range processing.

In some implementations, the Doppler processing pipeline may include (1) a resampling filter, (2) decimation with anti-aliasing filtering, (3) FFT, (4) a FIR filter, (5) Doppler peak finding, (5) Doppler peak fitting, and/or (7) Doppler statistics. In some implementations, the DSP system may apply a 2(N−1)/2N resampling filter. In some implementations, compute can be reduced by decimating prior to the FFT used in doppler processing In some implementations, the FFT can be half of the size it would have been if the output of the FFT were required for range processing. For the doppler processing, the time domain data can be run through a resampling filter and a decimation filter before calculating (e.g., computing, generating, obtaining) the FFT. In some implementations, after calculating the FFT, the DSP system may apply the speckle broadening compensation matched filter or filter bank.

In some implementations, the resampling filter can enable the processing to better utilize some of the benefits of M-sequences. M-sequences may have flat sidelobes in the power spectrum. In some implementations, M-sequences (of length $2^{n-1}$) may be padded with an extra 0 to make a length $2^n$ code. While this padding allows for using commonly utilized FFT architectures (examples being radix 2 or 4), the padding may destroy the desired sidelobe properties of M-sequences. In some implementations, the M-sequence code can be dilated, by using the resampling filter, so as to use the dyadic FFT without a loss of performance. An interpolation method can be used, which can be selected from among, but not limited to, linear, cubic methods, spline, or fractional methods including farrow structures. In some implementations, a linear interpolation can be used because it is simple and resource efficient. For each sample, a linear interpolation can be computed using the following formula:

$$x[m]=\delta x[n]+(1-\delta)x[n] \quad \text{(Equation 7)}$$

In this case, n increases from 1, 2, 3, 4, . . . , 2n, while δ decreases from 0 to −(1−½N) in steps of ½N.

In some implementations, the fractional methods can improve the performance of interpolation by constructing a filter parameterized by a fractional delay. In some implementations the filter is designed to achieve a unit gain over all frequencies while performing rational resampling such that $$\frac{f_{S\ New}}{f_{S\ Old}}=\frac{2^N}{2^{N-1}}.$$

In some implementations, an anti-aliasing filter can be used to decimate data. For example, since it is not necessary to compute all of 2N Doppler bins, if peak finding is performed over a subset of those bins, the data can be decimated (including the use of an anti-aliasing filter) before computing the FFT. In some implementations, a DSP system can use a Tx code having the same symbol rate as a sample rate of the DSP system, thereby effectively reducing the code interference in the doppler processing.

In some implementations, the DSP system may use a finite impulse response (FIR) filter for resampling before. For example, an FIR filter can be constructed by sampling a sinc function and then windowing the sinc function for finite support, thereby creating a new filter for each fractional offset. In some implementations, an FIR filter may load filter coefficients (e.g., taps) of each of a plurality of FIR filters from memory (e.g., ROM) and then reload the coefficients for every new input sample (e.g., input data) without purging the data path. In some implementations, an FIR filter can (1) receive input data including new input samples, (2) reload filter coefficients (e.g., taps) from memory with every new input sample, and (3) apply the reloaded FIR filter to the new input sample to generate output data. In some implementations, the size of the memory may be equal to the filter order (e.g., number of taps) times the code length.

The FIR filter can utilize a Farrow structure in a single polynomial reconstruction stage. In some implementations, the FIR filter may (1) receive input data, (2) apply a plurality of FIR filters (e.g., n FIR filters) in a filter bank to the input data to generate n input signals, (3) compute taps of a fractional filter based on n input signals and a fractional delay δ using with Lagrange interpolation (polynomial approximation), and (4) generate output data using the computed taps of the fractional filter. In some implementations, the Farrow structure can support arbitrary fractional delays (e.g., fractional delay δ), but also use polynomial reconstruction without storing and reloading filter coefficients (e.g., taps). In some implementations, when a new fractional delay is inputted to the single polynomial reconstruction stage (e.g., farrow structure), the farrow structure can effectively compute the taps of a fractional filter with Lagrange interpolation (polynomial approximation).

In some implementations, the Doppler peak finding/fitting operations can use a compensation filter that is optimized for speckle broadening. In some implementations, the compensation filter can be a Gaussian filter. In some implementations, the compensation filter can be a filter bank instead of a single filter.

In some implementations, the range processing pipeline may include (1) time domain data buffer, (2) a direct digital synthesizer (DDS) for time domain frequency correction and phase adjustment. (3) FHT processing, (4) range peak finding, (5) range peak broadening FIR filter, (6) range profile statistics, and/or (7) peak fitting. The FHT processing may include (1) input permutation, (2) FHT, and/or (3) output permutation. Since the FHT converts time domain data directly to the range domain, time domain doppler correction can be performed on undecimated data using the DDS to create sin and cos terms. In some implementations, the DDS can phase align subshots. In some implementations, the DSP system can perform the FHT processing by performing an input permutation, followed by computing the FHT, then performing an output permutation. In some implementations, before peak fitting, the DSP system may convolve the complex range profile with a kernels designed to improve peak find and/or peak fitting. In some implementations, the range peak finding/fitting operations can use a log polyfit method that is optimized for peak-fitting a function that is assumed to be Gaussian. Since the autocorrelation function (with respect to circular convolution of length $2^{n-1}$) of an m-sequence is impulse-like, a Gaussian kernel can be convolved with the m-sequence to create an auto-correlation function that results in improved peak fitting. In some implementations, the peak find operation can use the power or amplitude of a complex range profile. In some implementations, the peak fitting operation can first filter the complex range profile before converting the profile to power. In some implementations, only the filtered outputs of the bins neighboring the peak can be used instead of smoothing the entire range profile. For example, with a 21 tap filter, 21*3 operations could be performed instead of 21*2n−1 operations to generate three outputs. After filtering, each of the three outputs of the filter can be converted to power by calculating $real^2+imag^2$.

In some implementations, to replace the circular shift in the frequency domain, the DSP system may perform time domain frequency correction and phase adjustment by multiplying the time domain data with a complex exponential to generate corrected time domain data for $n^{th}$ bin as shown below:

$$\text{correction}_{time\ Domain}[n] = \cos(-dop\ \text{bin} * i * 2\pi * n / 2N - 1) + i\sin(-dop\ \text{bin} * i * 2\pi * n / 2N - 1) \quad \text{(Equation 8)}$$

where dop bin refers to a Doppler shift value (Δφ). In some implementations, a DDS can generate sin data and cos data. In some implementations, the DDS may include a dual port ROM containing samples of a unit circle. The ROM may have address ports which are a phase term which is driven by a counter. To create (e.g., output) sin data and cos data, the counter can be offset by a quarter of the number of addresses (pi/2=90°). To make a faster sinusoid, the counter can be incremented with higher phase values to perform a phase correction. After the sinusoids are created, the sinusoids can be multiplied by the time domain data. In some implementations the DDS can be implemented via the cordic algorithm.

In some implementations, a DSP system may perform FHT processing by (1) receiving input data (e.g., input samples), (2) performing an input permutation, (3) performing FHT transform, (4) performing an output permutation, and/or (5) generating output data. The input permutation and output permutation can convert between the FHT and a fast M-Sequence transform. In some implementations, when combined with the input and output permutations, the FHT transform can be equivalent to a correlation against an M-sequence (e.g., equivalent to a circular correlation of length $2^{n-1}$). The FHT may be a $2^n$ transform where the input has been padded with a zero such that this padding does not degrade performance. Additionally, the FHT may use additions and subtractions rather than multiplication and addition, thereby being more computational efficient. Moreover, the FHT can be optimized for SIMD by deconstructing the FHT into n stages of permutations each with a vector add and vector subtract.

In some implementations, the input and output permutations may be a simple static re-ordering of the input samples. The FHT block can be implemented in a plurality of ways including but not limited to (1) a plain Walsh-Hadamard transform, (2) a scalar FHT, and (3) SIMD-optimized FHT. The plain Hadamard transform may be least efficient because it is a large matrix multiply of $n^2$ operations. The scalar FHT may use similar deconstruction to the FFT and may be of complexity n log(n). The SIMD optimized FHT can improve the resource utilization compared to the IFFT version (e.g., IFFT 1254 in FIG. 12).

In some implementations, the SIMD optimization can reframe the FHT into n stages of re-ordering the data and then performing vector adds and subtracts. For each stage (11 stages for 2 k FHT), the DSP system may (1) construct an A vector and a B vector from either the input or the previous stage, (2) compute adds (A+B) and subtracts (A−B), and (3) re-ordering the output. Since the output is re-ordered at one stage, and then re-ordered again at the input at the next stage (when constructing vectors A and B), in some implementations, the two ordering steps can be combined into one step, which can reduce the order of operations to 2 steps—(1) constructing A and B vectors (e.g., vector permutation step) then (2) performing adds and subtracts.

In some implementations, vector adding 2 k samples may not be performed in a single operation, and vector intrinsics (e.g., vector instructions in SIMD processors) may not be used to re-order 2 k samples in a single operation. In some implementations, the adds and the subtracts can be separated into 2048/R adds and subtracts where R is a number of lanes (e.g., 2048/16=128 adds and subtracts) at each stage. In some implementations, the SIMD processor can perform R adds or subtracts in parallel (R is a positive integer) and can permute a vector of length R in a single operation. In some implementations, at each stage, samples may not be re-ordered all the way across the 2 k width. In some implementations, the re-ordering operation can be contained within R lanes for $\log_2(R)$ stages. If R=16, the re-ordering operation can be contained within 16 lanes for 4 stages. After the $\log_2(R)$ stages, a big 2 k re-order (e.g., 2 k scalar permute) can be performed. With 16 lanes available (R=4) and a 2 k transform (n=11 stages), the first 4 stages can use only vector intrinsics for re-ordering, then the fifth stage can perform a 2 k re-order (e.g., 2 k scalar permute), then the sixth-ninth stages can use only the vector intrinsics for re-ordering (e.g., vector permute), then the final stage (e.g., eleventh stage) can once again perform a 2 k re-order. Since the FHT processing may include an input permutation stage and an output permutation stage, the last stage of FHT re-ordering can be combined with the output permutation. Therefore, with the 16 lanes (R=16) and a 2 k transform (N=2048, n=11), 128 vector reordering operations (N/R=2048/16=128) can be performed per stage. The final number of operations can be 1024 vector re-orders (e.g., vector permutes), 1408 vector adds, 1408 vector subtracts, and 4 2 k scaler re-orders (when including the input and output permutations). This can be further optimized if 32 lanes is used. In that case the number of large 2 k scalar permutations can be reduced to 3.

Figure 5:
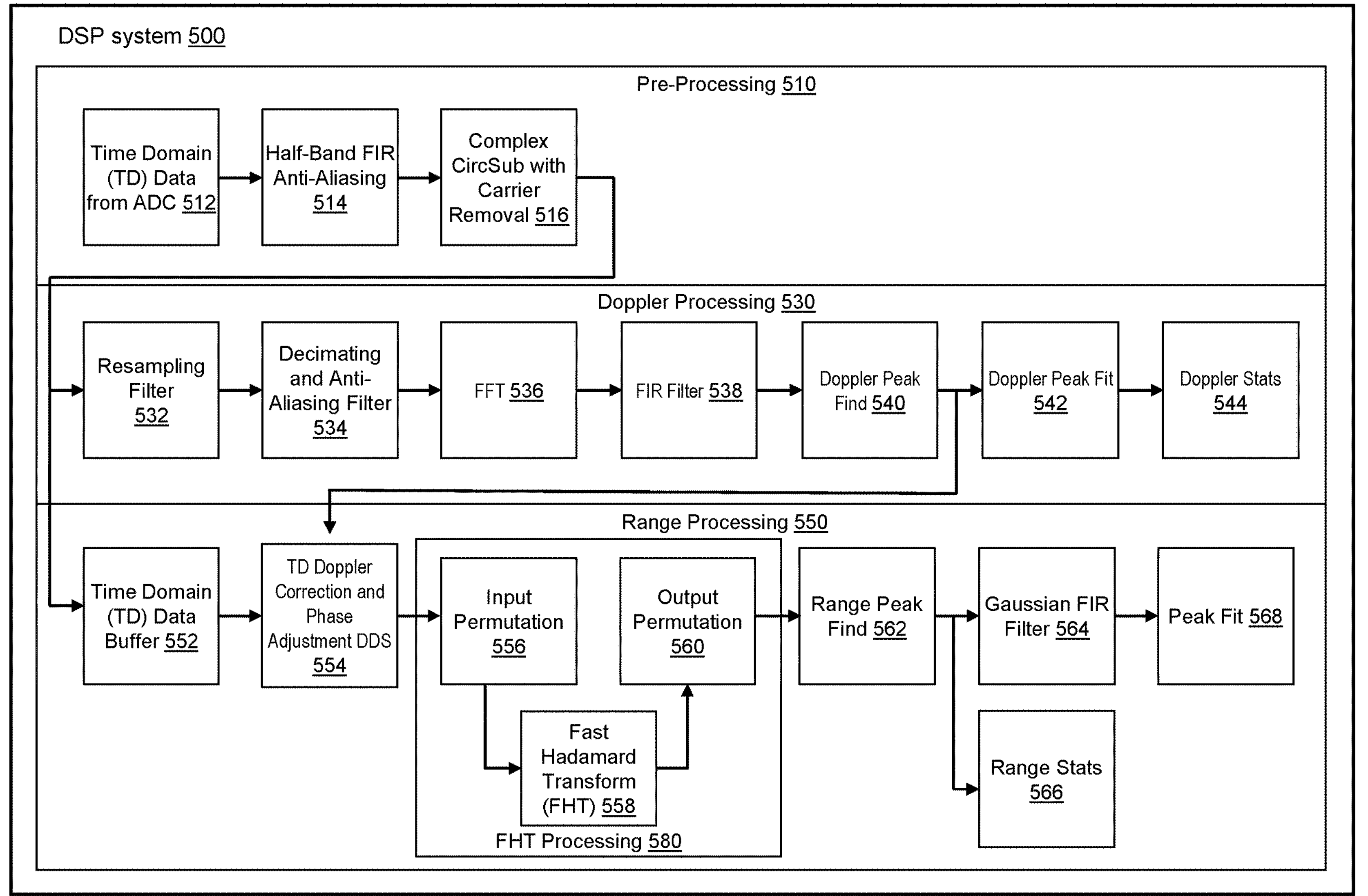
FIG. 5 is a block diagram illustrating an example of a DSP system for Doppler and range processing, according to some implementations.

FIG. 5 is a block diagram illustrating an example of a DSP system 500 for Doppler and range processing, according to some implementations. The DSP system 500 can implement a pipeline structure for Doppler and range processing. The pipeline structure may include pipelines for (1) pre-processing 510, (2) Doppler processing 530, and/or (3) range processing 550. The pre-processing pipeline 510 may include (1) time domain data reception 512 (e.g., from an ADC), (2) Decimating filter with anti-aliasing 514, and/or (3) background estimation and removal 516. The time domain data reception 512 can be performed with an input frequency of FS and an output frequency of FS/2 GS/s.

Referring to FIG. 5, the Doppler processing pipeline 530 may include (1) a resampling filter 532, (2) decimating filter with anti-aliasing 534, (3) FFT 536, (4) a FIR filter 538, (5) Doppler peak finding 540, (5) Doppler peak fitting 542, and/or (7) Doppler statistics 544. For example, the DSP system may apply a 2N−½N resampling filter with an output sampling frequency of FS/2*2N−½N MS/s. The decimating filter with anti-aliasing 534 can be performed with an input frequency of FS/2*2N−½N and an output frequency of FS/4*2N−½NMS/s. The FFT 536 size can be equal to 2N/2, where N is the code length. For the doppler processing, the time domain data can be run through the resampling filter 532 and the decimation block with anti-aliasing (e.g., half-band filters, CIC filters, or low-pass filters in general) 534 before calculating (e.g., computing, generating, obtaining) the FFT 536. In some implementations, after calculating the FFT 536, the DSP system may apply the speckle broadening compensation filter or filter bank.

In some implementations, the resampling filter 532 can be used to enable some of the benefits of M-sequences. M-sequences may have flat sidelobes in the power spectrum. M-sequences (of length $2^{n-1}$) may be padded with an extra 0 to make a length $2^n$ code. While this padding allows for using a radix-2 FFT, the padding may destroy the excellent sidelobe properties of M-sequences. The M-sequence code can be dilated so as to use the dyadic FFT without a loss of performance. An interpolation method can be used, which can be selected from among, but not limited to, linear, cubic, not-a-knot cubic (spline), or fractional methods. The linear interpolation can be used because it is simple and resource efficient. For each sample, a linear interpolation can be computed using Equation 7. The fractional methods can improve the performance of interpolation by constructing a filter parameterized by a fractional delay. In some implementations, the anti-aliasing filter 534 can be used to decimate data. For example, since it is not necessary to compute all of 2048 Doppler bins, if peak finding is performed over a subset of doppler bins, the data can be decimated using the anti-aliasing filter 534 before computing the FFT 536. The anti-aliasing filter 534 can be used to reduce the interference from the code spectrum The DSP system 500 can use a Tx code having the same symbol rate as a sample rate of the DSP system, thereby effectively reducing its power by 2 using the anti-aliasing filter 534. The resampling filter 532 can be combined with the anti-aliasing filter 534 (as a decimation filter). The decimating filter with anti-aliasing can be performed with an input sample rate of FS/2 and an output sample rate of FS/4*2N−½N.

Figure 6:
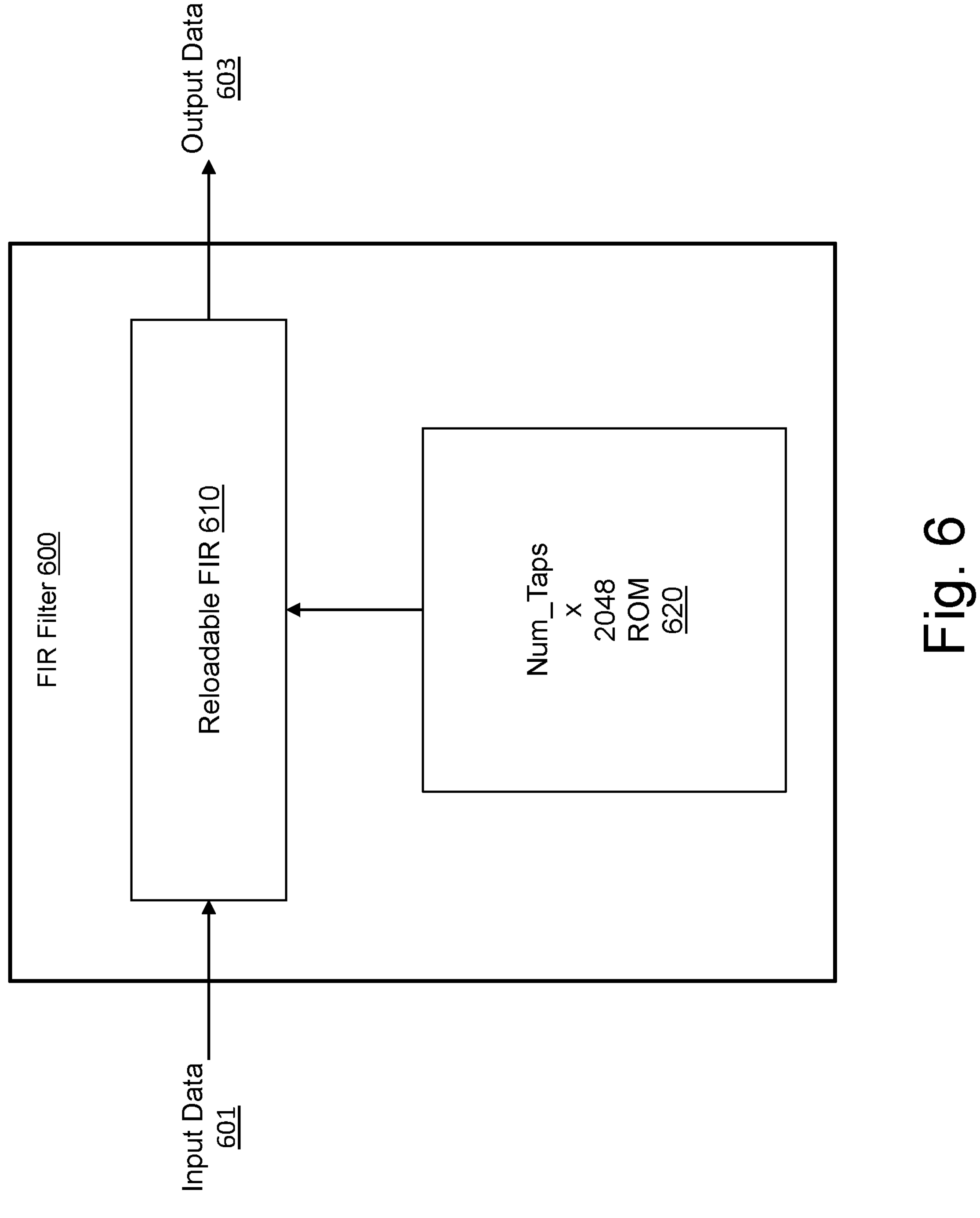
FIG. 6 is a block diagram illustrating an example of a finite impulse response (FIR) filter for Doppler processing, according to some implementations.
Figure 7:
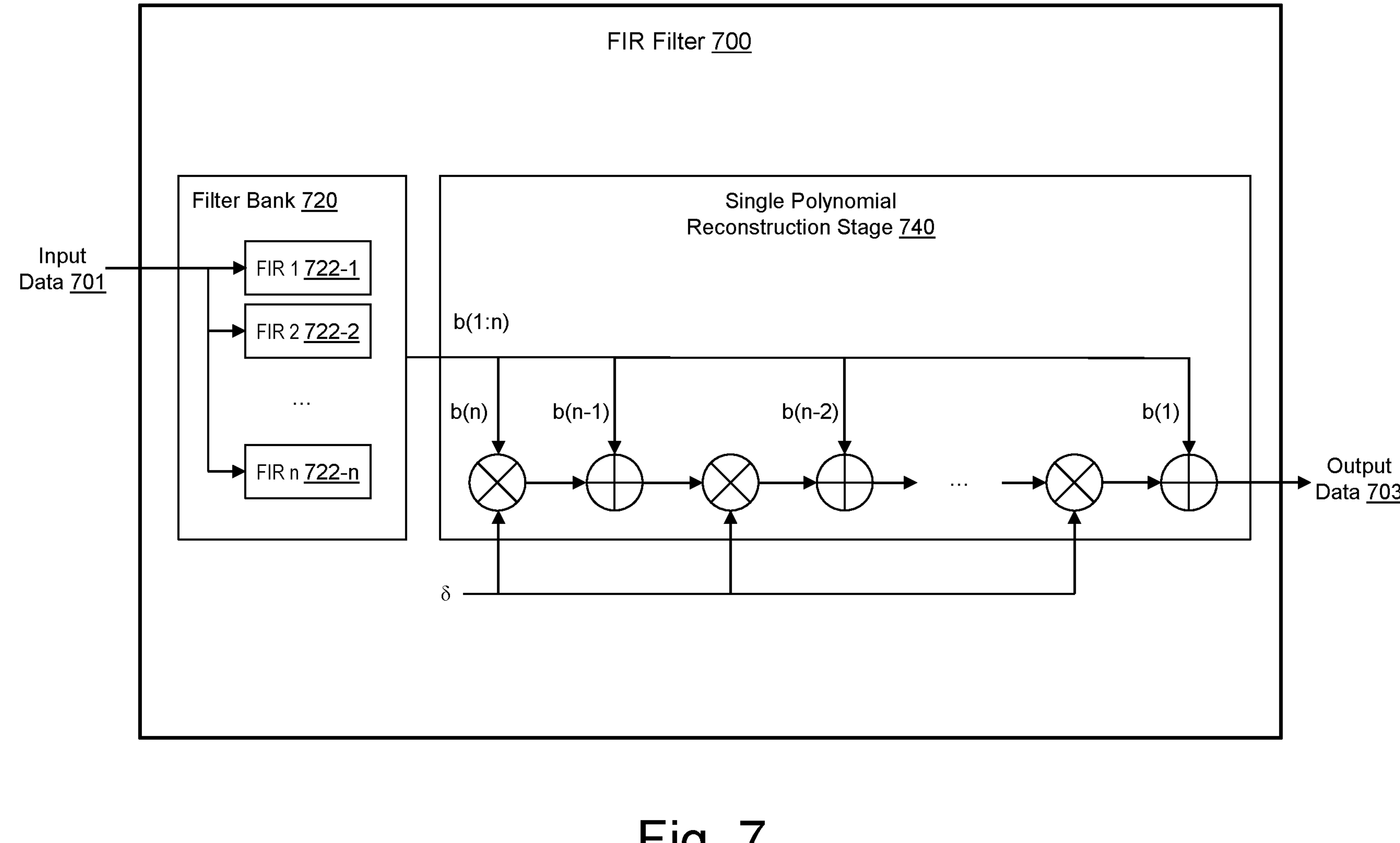
FIG. 7 is a block diagram illustrating another example of an FIR filter for Doppler processing, according to some implementations.

The FIR filter 538 can be implemented in different manners (e.g., FIR filter 600 in FIG. 6, FIR filter 700 in FIG. 7). FIG. 6 is a block diagram illustrating an example of a FIR filter 600 for Doppler processing, according to some implementations. The FIR filter 600 can be constructed by sampling a sinc function and then windowing the sinc function for finite support, thereby creating a new filter for each fractional offset. The FIR filter 600 may store filter coefficients (e.g., taps) of each of a plurality of FIR filters in memory (e.g., ROM 620) and then reload the coefficients for every new input sample (e.g., input data 601) without purging the data path. The FIR filter 600 can (1) receive input data 601 including new input samples, (2) reload filter coefficients (e.g., taps) from memory 620 with every new input sample 601, and (3) apply the reloaded FIR filter 610 to the new input sample to generate output data 603. The size of the memory may be equal to the filter order (e.g., number of taps) times the code length, N.

FIG. 7 is a block diagram illustrating another example of an FIR filter 700 for Doppler processing, according to some implementations. The FIR filter 700 can utilize a Farrow structure in a single polynomial reconstruction stage 740. The FIR filter 700 may (1) receive input data 701, (2) apply a plurality of FIR filters (e.g., n FIR filters 722-1, 722-2, . . . , **722-*n*) in a filter bank 720 to the input data 701 to generate n input signals b(1:n), (3) compute taps of a fractional filter based on n input signals b(1:n) and a fractional delay δ using with Lagrange interpolation (polynomial approximation), and (4) generate output data 703 using the computed taps of the fractional filter. The Farrow structure in the single polynomial reconstruction stage 740 can support arbitrary fractional delays (e.g., fractional delay δ), but also use polynomial reconstruction without storing and reloading filter coefficients (e.g., taps). When a new fractional delay is inputted to the single polynomial reconstruction stage 740 (e.g., farrow structure), the farrow structure can effectively compute the taps of a fractional filter with Lagrange interpolation (polynomial approximation). In addition, the farrow structure can replace the order of operations of computing a polynomial approximation for each filter tap and the convolution with the data. Because of this switch in the order of operations, only one stage of polynomial reconstruction can be performed, but instead the amount of convolution can be increased. This results in n convolutions of length m, where n is the number of taps of a fractional filter (e.g., n is the number of FIR filters 722-1, 722-2, . . . , 722-*n* in the filter bank 720) and m is the order of the polynomial reconstruction (e.g., m is a length of FIR filters in the filter bank 720**).

Referring back to FIG. 5, the Doppler peak finding/fitting operations 540, 542 can use a filter that is designed to minimize losses due to speckle broadening. The filter can be a Gaussian filter. The filter can be a filter bank instead of a single filter. The range processing pipeline 550 may include (1) time domain data buffer 552, (2) a direct digital synthesizer (DDS) 554 for time domain frequency correction and phase adjustment. (3) FHT processing 580, (4) range peak finding 562, (5) FIR filter(s) for improving peak finding/fitting performance 564, (6) range profile statistics 566, and/or (7) peak fitting 568. The FHT processing 580 may include (1) input permutation 556, (2) FHT transform 558, and/or (3) output permutation 560. The time domain data can be buffered 552 at FS/2 MS/s. The FHT 558 can be 2 k FHT transform (N=2048, n=11). Since the FHT converts time domain data directly to the range domain, time domain doppler correction can be performed on undecimated data using the DDS 554 to create sin and cos terms. The DDS 554 can phase up shots. The DSP system 500 can perform the FHT processing by performing an input permutation 556, followed by computing the FHT 558, then performing an output permutation 560. Before peak fitting 568, the DSP system 500 may convolve the complex range profile with a Gaussian kernel (e.g., using Gaussian FIR filter 564). The range peak finding/fitting operations 562, 568 can use a log polyfit method that is designed for peak fitting a function that is assumed to be Gaussian. Since the auto-correlation function (with respect to circular convolution of length $2^{n-1}$) of an m-sequence is impulse-like, a Gaussian kernel can be convolved with the m-sequence to create an auto-correlation function that results in improved peak fitting performance. The peak find operation 562 can use the power of a complex range profile. The peak fitting operation 568 can first filter the complex range profile before converting the profile to power. In some implementations, only the filtered outputs of the bins neighboring the peak can be used instead of smoothing the entire range profile. For example, with a 21 tap Gaussian filter, 21*3 operations can be performed instead of 21*2N−1 operations to generate three outputs. After filtering, each of the three outputs of the filter can be converted to power by calculating $real^2+imag^2$.

Figure 8:
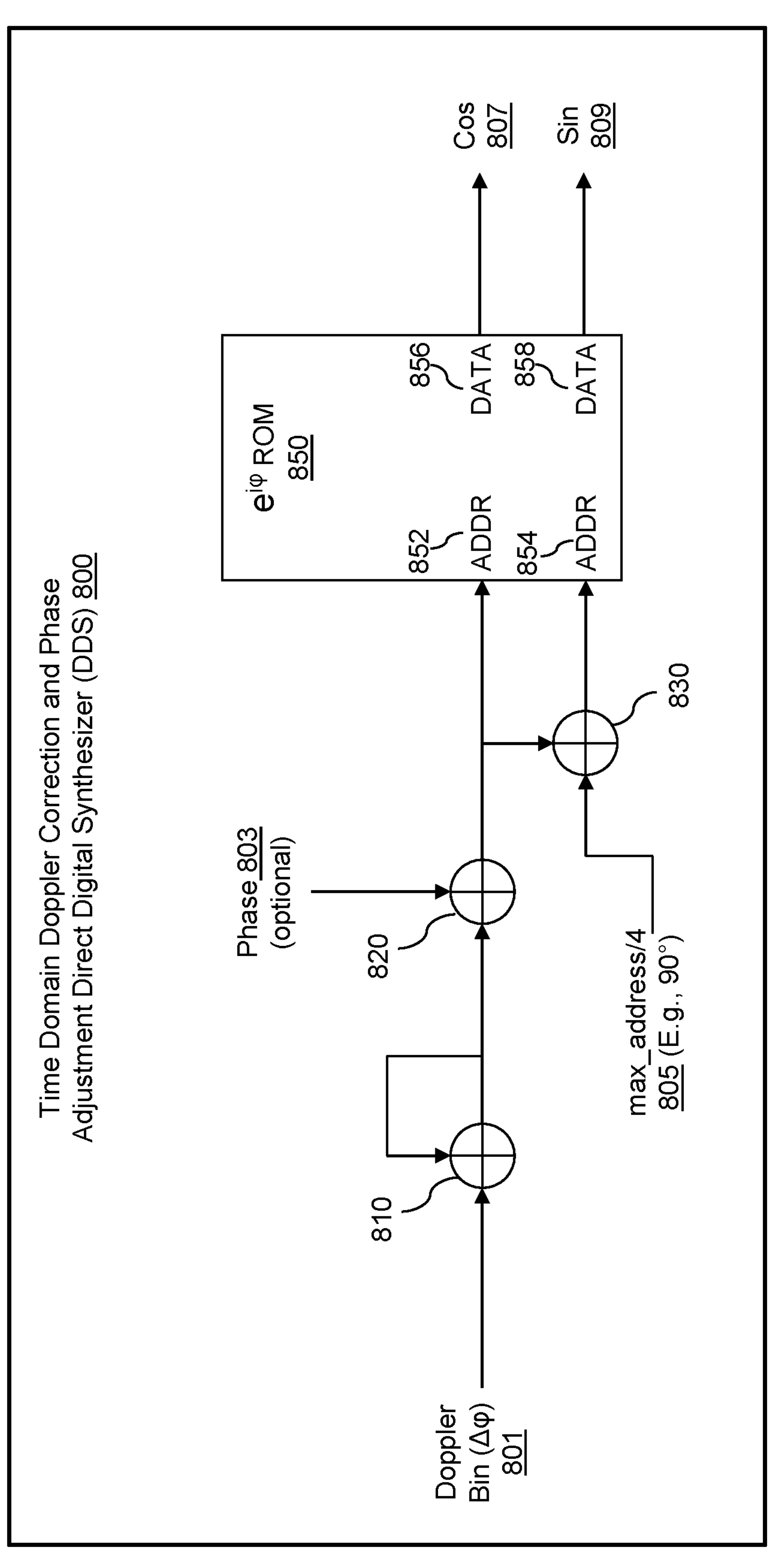
FIG. 8 is a block diagram illustrating another example of a direct digital synthesizer (DDS) for range processing, according to some implementations.

FIG. 8 is a block diagram illustrating another example of a direct digital synthesizer (DDS) 800 for range processing, according to some implementations. To replace the circular shift in the frequency domain, the DSP system (e.g., DSP system 500) may perform time domain Doppler correction and phase adjustment 554 by multiplying the time domain data with a complex exponential to generate corrected time domain data using Equation 8. The DDS 800 can generate cos data 807 and sin data 809 at data ports 856, 858 of a dual port ROM 850. The ROM 850 may be a dual port ROM containing samples of a unit circle. The ROM 850 may have address ports 852, 854 which are a phase term which is driven by a counter 810. To create (e.g., output) sin data 809 and cos data 807, the counter can be offset 830 by a quarter of the number of addresses 805 (e.g., pi/2=90°). To make a faster sinusoid, the counter 810 can be incremented with higher phase values 803 to perform a phase correction. After the sinusoids are created, the sinusoids can be multiplied by the time domain data.

Figure 9:
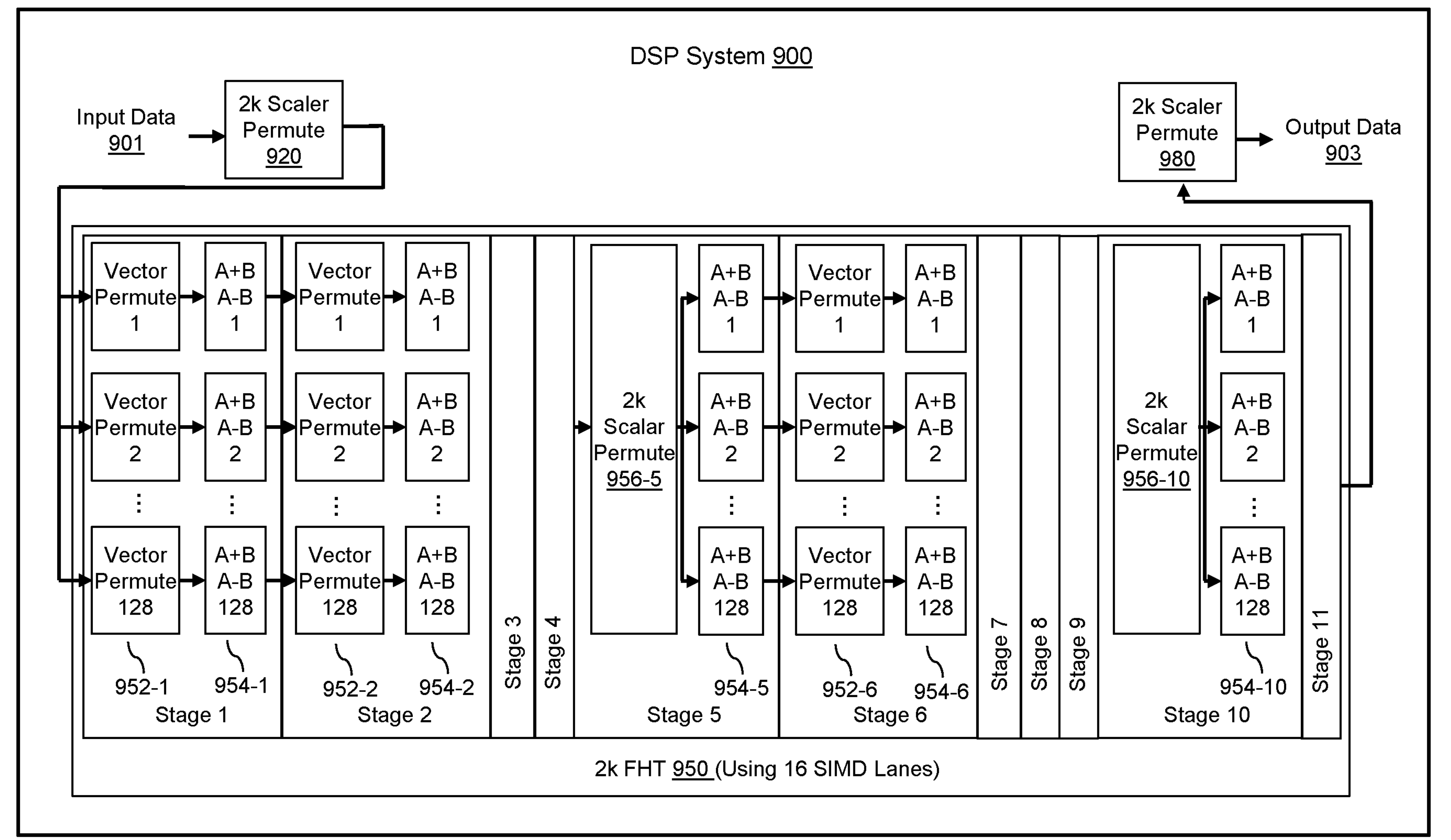
FIG. 9 is a block diagram illustrating an example of Fast Hadamard Transform (FHT) processing for range processing, according to some implementations.

FIG. 9 is a block diagram illustrating an example of Fast Hadamard Transform (FHT) processing for range processing, according to some implementations. A DSP system (e.g., DSP system 900) may perform FHT processing by (1) receiving input data 901 (e.g., input samples), (2) performing an input permutation 920, (3) performing FHT transform 950, (4) performing an output permutation 980, and/or (5) generating output data 903. For example, the DSP system 900 may use 2 k FHT (N=2048, n=11) with 16 SIMD lanes (R=16). The input permutation 920 and output permutation 980 can convert between the FHT and a fast M-Sequence transform. When combined with the input and output permutations, the FHT transform 950 can be equivalent to a correlation against an M-sequence (e.g., equivalent to a circular correlation of length $2^{n-1}$). The FHT 950 may be a $2^n$ transform where the input has been padded with a zero such that this padding does not degrade performance. Additionally, the FHT 950 may use additions and subtractions (e.g., 954-1, 954-2, . . . , 954-10) rather than multiplication and addition, thereby being more computational efficient. Moreover, the FHT 950 can be optimized for SIMD by deconstructing the FHT into n stages (e.g., 11 stages) of permutations each with a vector add and vector subtract.

Referring to FIG. 9, the input and output permutations 920, 980 may be a simple static re-ordering of the input samples. The FHT block 950 can be implemented in 3 ways—(1) a plain Hadamard transform, (2) a scalar FHT, and (3) SIMD-optimized FHT. The plain Hadamard transform may be least efficient because it is a large matrix multiply of $n^2$ operations. The scalar FHT may use similar deconstruction to the FFT and may be of complexity n log(n). The SIMD optimized FHT can improve the resource utilization compared to the IFFT version (e.g., IFFT 1254 in FIG. 12).

In some implementations, the SIMD optimization can reframe the FHT 950 into n stages of re-ordering the data and then performing vector adds and subtracts. For each stage (11 stages for 2 k FHT), the DSP system may (1) construct an A vector and a B vector from either the input or the previous stage, (2) compute adds (A+B) and subtracts (A−B), and (3) re-ordering the output. Since the output is re-ordered at one stage, and then re-ordered again at the input at the next stage (when constructing vectors A and B), as shown in FIG. 9, the two ordering steps can be combined into one step (e.g., vector permutation step 952-1, 952-2, . . . ), which can reduce the order of operations to 2 steps—(1) constructing A and B vectors (e.g., vector permutation step 952-1, 952-2, . . . ) then (2) performing adds and subtracts (e.g., adds/subtracts step 954-1, 954-2, . . . , 954-10).

In some implementations, vector adding 2 k samples may not be performed in a single operation, and vector intrinsics (e.g., vector instructions in SIMD processors) may not be used to re-order 2 k samples in a single operation. The adds and the subtracts (e.g., 954-1, 954-2, . . . , 954-10) can be separated into 2048/R adds and subtracts where R is a number of lanes (e.g., 2048/16=128 adds and subtracts) at each stage. In this manner, an SIMD processor can perform R adds or subtracts in parallel (R is a positive integer) and can permute a vector of length R in a single operation. At each stage, samples may not be re-ordered all the way across the 2 k width. The re-ordering operation can be contained within R lanes for $\log_2(R)$ stages. If R=16, the re-ordering operation can be contained within 16 lanes for 4 stages. After the $\log_2(R)$ stages, a big 2 k re-order (e.g., 2 k scalar permute) can be performed. With 16 lanes available (R=4) and a 2 k transform (n=11 stages), the first 4 stages (e.g., stage 1 to stage 4 in FIG. 9) can use only vector intrinsics for re-ordering, then the fifth stage (e.g., stage 5 in FIG. 9) can perform a 2 k re-order (e.g., 2 k scalar permute 956-5), then the sixth-ninth stages (e.g., stage 6 to stage 9 in FIG. 9) can use only the vector intrinsics for re-ordering (e.g., vector permute), then the final stage can once again perform a 2 k re-order. Since the FHT processing may include an input permutation stage and an output permutation stage, the last stage of FHT re-ordering (e.g., stage 11 in FIG. 9) can be combined with the output permutation 980. Therefore, with the 16 lanes (R=16) and a 2 k transform (N=2048, n=11), 128 vector reordering operations (N/R=2048/16=128) can be performed per stage. The final number of operations can be 1024 vector re-orders (e.g., vector permutes), 1408 vector adds, 1408 vector subtracts, and 4 2 k scaler re-orders (when including the input and output permutations). This can be further optimized if 32 lanes is used. In that case the number of large 2 k scalar permutations can be reduced to 3.

Figure 10:
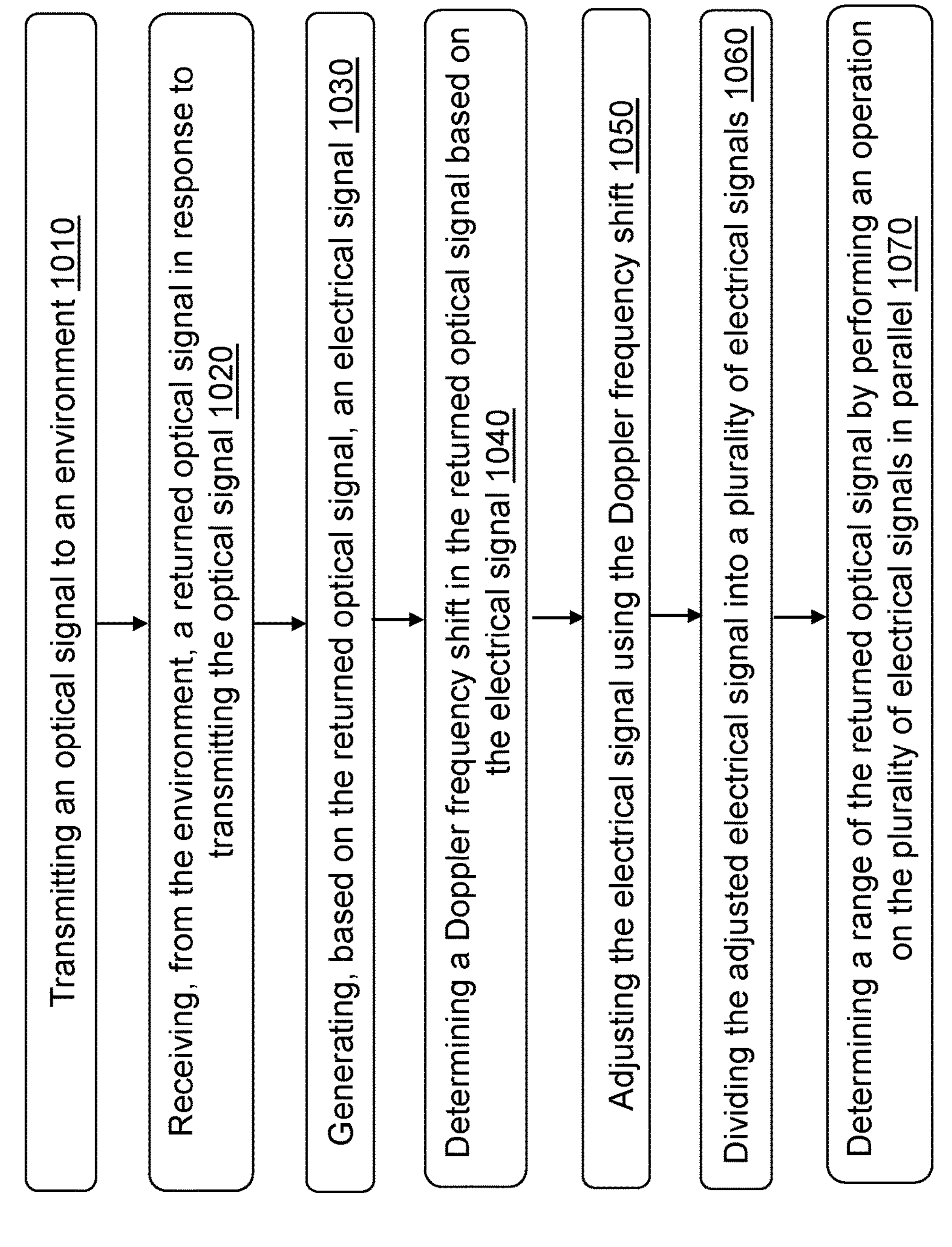
FIG. 10 is a flowchart illustrating an example methodology for range processing using FHT according to some implementations.

FIG. 10 is a flowchart illustrating an example methodology for range processing using FHT in a DSP system (e.g., DSP system 500, DSP system 900) of a LIDAR system (e.g., LIDAR sensor system 300) including one or more processors (e.g., processors 410) according to some implementations. In this example methodology, a process 1000 begins at step 1010 by transmitting, by one or more processors, an optical signal to an environment. In some implementations, in transmitting the optical signal to the environment, the one or more processors may be further configured to modulate (e.g., modulate by the modulator 304), based on a sequence code that is indicative of a sequence of phases for the optical signal, the optical signal to produce a phase-encoded optical signal, and transmit the phase-encoded optical signal (e.g., TX optical waveform 305) to the environment.

At step 1020, in some implementations, the one or more processors may receive, from the environment, a returned optical signal in response to transmitting the optical signal. At step 1030, in some implementations, the one or more processors may generate, based on the returned optical signal, an electrical signal (e.g., time domain data form ADC 512).

At step 1040, in some implementations, the one or more processors may determine a Doppler frequency shift (e.g., as a result of performing Doppler peak find 540) in the returned optical signal based on the electrical signal. In some implementations, in determining the Doppler frequency shift in the returned optical signal, the one or more processors may be further configured to resample the electrical signal in time domain (e.g., as a result of applying the resampling filter 532), and determine the Doppler frequency shift in the returned optical signal in time domain based on a power of two Fast Fourier Transform of the electrical signal (e.g., as a result of computing FFT 536).

At step 1050, in some implementations, the one or more processors may adjust the electrical signal using the Doppler frequency shift. The electrical signal may adjusted in time domain using the Doppler frequency shift (e.g., TD Doppler correction and phase adjustment DDS 554). At step 1060, in some implementations, the one or more processors may divide the adjusted electrical signal into a plurality of electrical signals (e.g., dividing input data 901 into 16 SIMD lanes in FIG. 9).

At step 1070, in some implementations, the one or more processors may determine a range of the returned optical signal by performing an operation on the plurality of electrical signals in parallel. In some implementations, the operation may be performed on the plurality of electrical signals using a single instruction multiple data (SIMD) parallel processing. For example, an SIMD processor can perform R adds or subtracts in parallel (e.g., R is the number of SIMD lanes) and can permute a vector of length R in a single operation. In some implementations, in determining the range of the returned optical signal, the one or more processors may be further configured to perform, based on a sequence code (e.g., M-sequence) that is indicative of a sequence of phases for the transmitted optical signal, a Fast Hadamard Transform (e.g., FHT 950) on the adjusted electrical signal.

In some implementations, in determining the range of the returned optical signal, the one or more processors may be further configured to perform a Fast Hadamard Transform (e.g., FHT 950) on the adjusted electrical signal (e.g., input data 901). The operation may be one of permutating vectors (e.g., vector permute 952-1, 952-2, . . . ), adding a first vector and a second vector, or subtracting the second vector from the first vector (e.g., adds and subtracts 954-1, 954-2, . . . ). In determining the range of the returned optical signal, the one or more processors may be further configured to determine a peak of a result of the Fast Hadamard Transform (e.g., by performing range peak find 562), and determine, based on the peak, the range of the returned optical signal. The transmitted signal may include M blocks of N symbols where each of M and N is a positive integer and N is a power of 2 (e.g., N=2048 in FIG. 9). The Fast Hadamard Transform may be performed with input data having N symbols, the number of the plurality of electrical signals may be K (e.g., K=128 in FIG. 9) where K is a positive integer and N is a multiple of K, the Fast Hadamard Transform may be performed in $\log_2 N$ stages (e.g., 11 stages in FIG. 9). The $\log_2 N$ stages may include a stage of first type (e.g., stage 1, stage 2, stage 6 in FIG. 9) in which K number of operations of permutating the vectors are executed in parallel, K number of operations of adding the first vector and the second vector may be executed in parallel, and K number of operations of subtracting the second vector from the first vector may be performed in parallel. The $\log_2 N$ stages may include a stage of second type (e.g., stage 5, stage 10 in FIG. 9) in which scalar permutation of N symbols are scalar permutated, K number of operations of adding the first vector and the second vector may be executed in parallel, and K number of operations of subtracting the second vector from the first vector may be performed in parallel. In some implementations, in performing the Fast Hadamard Transform, the one or more processors may be further configured to execute a stage of second type (e.g., stage 5) after executing $\log_2 R$ stages of first type, where R=N/K (e.g., after executing stage 1 to stage 4; $\log_2 R=\log_2 16=4$).

7. A Lidar System Using Doppler and Range Pipelines (Tiles)

Figure 11:
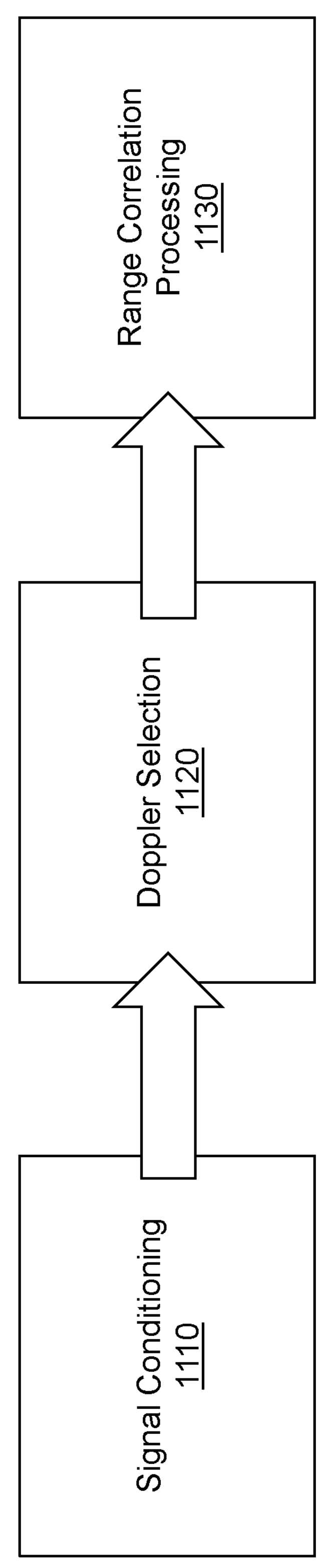
FIG. 11 is a block diagram illustrating example Doppler and range processing, according to some implementations.

FIG. 11 is a block diagram 1100 illustrating example Doppler and range processing, according to some implementations. In some implementations, a transmission waveform used for Doppler and range processing may include (1) a amplitude and/or phase and/or frequency modulated signal, and/or (2) an un-modulated continuous wave (CW) carrier. In some implementations, Doppler and range processing may include (1) signal conditioning 1110 (e.g., applying signal conditioning such as a background estimation and removal, demodulation, etc.), (2) Doppler selection 1120 (e.g., selecting Doppler peaks, searching power spectrum of Rx signal for carrier, etc.), and/or (3) range correlation processing 1130 (e.g., computing correlation versus Tx code, using frequency corrected range correlation, finding a delay with maximum correlation (range selection), etc.).

Figure 12:
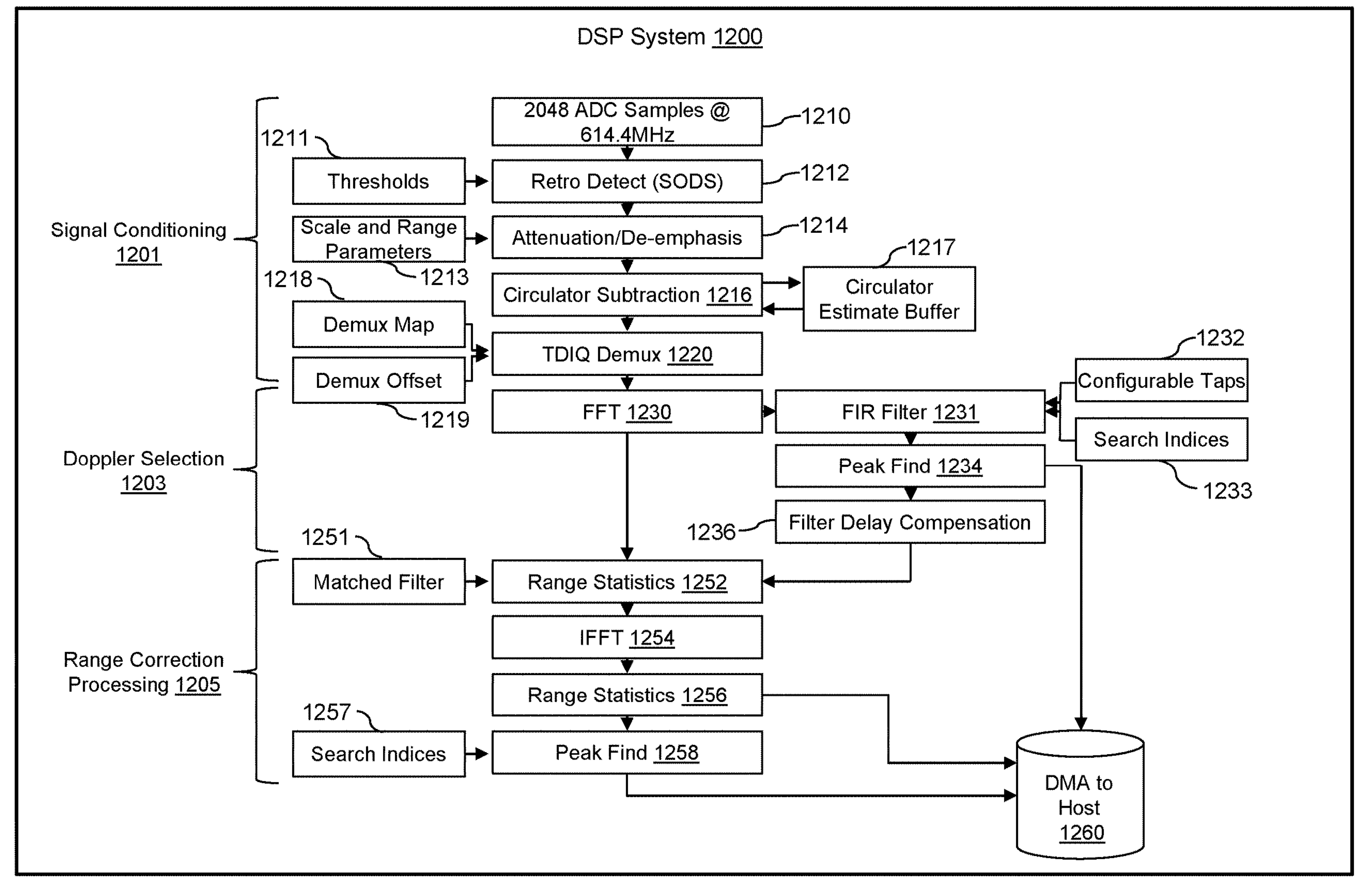
FIG. 12 is a block diagram illustrating an example of a DSP system for Doppler and range processing, according to some implementations.

FIG. 12 is a block diagram illustrating an example of a DSP system 1200 for Doppler and range processing, according to some implementations. The DSP system 1200 may perform (1) signal conditioning 1201, (2) Doppler selection 1203, and/or (3) range correlation processing 1205. For the signal conditioning 1201, the DSP system 1200 may receive a plurality of ADC samples at step 1210, detect retroreflectors using power measures with or without pre-filtering based on one or more thresholds 1211 at step 1212, perform attenuation and/or de-emphasis the detected objects based on scale and/or range parameters 1213 at step 1214, perform preprocessing 1217 at step 1216, and/or perform time-domain IQ (TDIQ) de-multiplexing (demux) using a demux map 1218 and/or a demux offset 1219 at step 1220.

For the Doppler selection 1203, the DSP system 1200 may perform FFT on output data from the TDIQ demux 1220 at step 1230, apply a FIR filter (to remove noise, for example) at step 1231 based on configurable taps 1232 and/or search indices 1233 at step 1231, find one or more Doppler peaks at step 1234, and/or perform filtering and filter delay (e.g., filtering delay) compensation at step 1236. For the range correlation processing 1205, the DSP system 1200 may calculate (e.g., compute, obtain) range profile statistics data using one or more matched filters 1251 at step 1252, perform inverse FFT (IFFT) at step 1254 to convert the frequency domain range profile statistics data into time domain range profile statistics data 1256 (which may be stored in the storage 1260), and/or find one or more peaks using search indices 1257 at step 1258.

To solve this problem, in some implementations, systems and methods for LIDAR sensor can efficiently compute range/doppler solutions for a coded coherent LIDAR. In some implementations, the systems and methods can be applicable to configurations where the per-shot integration time is significantly longer than the two-way time of flight for a desired range window. By exploiting the properties of pseudo-random binary sequences, the systems and methods can realize a highly computationally efficient implementation with superior probability of detection (POD), false alarm rate (FAR), and/or peak-to-sidelobe ratio (PSLR). With the improved PSLR, a LIDAR sensor system can maintain a high dynamic range between multi-target returns to operate in degraded visual environments (DVE). In some implementations, a LIDAR sensor can utilize a pipeline architecture (e.g., pipeline processing, tiled processing) to provide both a reduction of resource utilization and a performance boost.

In some implementations, systems and methods for range/doppler processing may be agnostic to averaging schemes. For example, a LIDAR sensor system can perform phase correction by summing or averaging consecutive sub-shots either incoherently, coherently, or in combination. The systems and methods for range/doppler processing may not interfere with any of these averaging schemes.

In some implementations, for Rx processing, a DSP system may utilize hardware IQ (or "true" IQ) processing (instead of TDIQ) on Rx signals with an optical hybrid and/or separate I and Q receiver channels.

In some implementations, a method for implementing a DSP system may include (1) implementing a basic FFT/IFFT structure for Doppler and range processing (e.g., FFT/IFFT structure shown in FIG. 12); (2) implementing a FFT/IFFT pipeline structure (e.g., FFT/IFFT pipeline shown in FIG. 14 or FIG. 15) that can achieve the performance of the basic FFT/IFFT structure; and (3) implementing a FFT/FHT pipeline with full performance and compute optimization (e.g., decoupled FFT/FHT pipeline shown in FIG. 17).

In some implementations, with the CW laser, a DSP system may perform integration CW processing by (1) receiving N ADC samples at step 1; (2) dividing those samples into M tiles (e.g., sub-shots or pipelines) at steps 2-1, 2-2, 2-3, 2-4; (3) performing N/M sized FFT on the respective tiles individually at steps 3-1, 3-2, 3-3, 3-4; (4) calculating (e.g., computing, obtaining) an M:1 incoherent average of the (four) results of FFT at step 4; and/or (5) calculating (e.g., computing, obtaining) incoherent power spectrum of the calculated 4:1 incoherent average at step 5. The DSP system may perform the integration CW processing for a (relatively) shorter time because the ranging code can perform 4 times during the integration period. For example, the DSP system can process the steps 2-1, 2-2, 2-3, 2-4 independently, process the steps 3-1, 3-2, 3-3, 3-4 independently, and then combine the (four) results of FFT at step 4. In this manner, an N-length range correlation can exhibit the same SNR reduction as doppler peak processing. Moreover, smaller transforms can experience proportionally less doppler and range domain SNR loss due to speckle. For example, dividing the integration time into N/M tiles can reduce SNR loss due to speckle, but now each tile has −M*sqrt (2) dB less signal In some implementations, the DSP system can perform incoherent averaging by adding signals in power (rather than complex amplitude) which is an effective way to combine peak energy. Additionally, incoherent averaging can change the probability distribution of the noise background.

In some implementations, further to receiving a previous shot (e.g., Rx signal), a DSP system may receive a plurality of ADC samples as a current shot at step 1. The DSP system may divide N samples into M sets of N/M samples (e.g., four tiles, sub-shots, or pipelines), perform preprocessing on the respective tiles at steps 2-1, 2-2, 2-3, 2-4, and perform a FFT on N/M samples in the respective tiles at steps 3-1, 3-2, 3-3, 3-4. In some implementations, the DSP system can process the steps 2-1, 2-2, 2-3, 2-4 independently and/or in parallel, and process the steps 3-1, 3-2, 3-3, 3-4 independently and/or in parallel. The DSP system may calculate (e.g., compute, obtain) an incoherent power spectrum by combining (e.g., calculating an M:1 incoherent average power spectrum) outputs of FFT from the M tiles at step 4-1, apply a FIR filter (to remove noise or smooth the power spectrum, for example) to the incoherent power spectrum at step 4-2, and find one or more Doppler peaks from the incoherent power spectrum at step 4-3, and/or store the one or more Doppler peaks in a storage (host storage) via DMA. In some implementations, the DSP system may calculate the M:1 incoherent average power spectrum, apply the FIR filter and perform the peak finding before continuing to cross-multiply at steps 5-1, 5-2, 5-3, 5-4 and IFFT at steps 6-1, 6-2, 6-3, 6-4.

In some implementations, the DSP system may perform phase correction of N/M samples (e.g., power spectrum) in each tile using the Doppler peaks found at step 4-3. The DSP system may cross-multiply each N/M tile spectrum by Tx conjugate (e.g., matched filter) at steps 5-1, 5-2, 5-3, 5-4, and calculate (e.g., compute, obtain) IFFT to generate a corresponding range profile at steps 6-1, 6-2, 6-3, 6-4. In some implementations, the DSP system can process the steps 5-1, 5-2, 5-3, 5-4 independently and/or in parallel, and process the steps 6-1, 6-2, 6-3, 6-4 independently and/or in parallel. The DSP system may combine (e.g., calculating a M:1 incoherent average) the range profiles generated at steps 6-1, 6-2, 6-3, 6-4 to generate a N/M incoherent range profile at step 7-1. The DSP system may calculate (e.g., compute, obtain) range profile statistics data using the incoherent range profile at step 7-2, and/or find one or more range peaks using the incoherent range profile at step 7-3 and store the one or more range peaks in the host storage via DMA. The DSP system may receive a next shot and repeat the above-noted processing on the next shot.

In some implementations, a DSP system may perform semi-coherent range processing by (1) performing phase correction based on one or more local Doppler peaks found using N/M samples (e.g., power spectrum) in each of a plurality of tiles, and (2) performing phase correction for finding range peaks based on one or more global Doppler peaks found using an incoherent average power spectrum. Generally, the phase of Doppler peaks and the phase of range peaks are correlated. Thus, the DSP system can perform, in the range processing stage, phase correction in the frequency domain using the Doppler peaks. In some implementations, to avoid unrealizable compute growth, the DSP system can use coherent addition (e.g., calculating a coherent sum of phase corrected spectra) prior to calculating a range correlation (e.g., cross-multiplying phase corrected spectrum by a Tx conjugate. In this manner, the DSP system can perform a fewer number of IFFTs than the number of FFTs. For example, if 4 FFTs and 3 FHTs are performed, the compute cost can be (4×FFTs+3×FHTs), the CW implementation according to some implementations has approximately 3.5 times the compute cost of a QCW implementation (e.g., implementation shown in FIG. 12)

In some implementations, further to receiving a previous shot (e.g., Rx signal), a DSP system may receive a plurality of ADC samples as a current shot at step 1. The DSP system may divide N samples into four sets of N/M samples (e.g., four tiles, sub-shots, or pipelines), and perform FFT on N/M samples in the respective tiles at steps 3-1, 3-2, 3-3, 3-4. In some implementations, an inference removal algorithm may be performed sequentially within each of the four tiles. In some implementations, the DSP system can process the steps 2-1, 2-2, 2-3, 2-4 independently and/or in parallel, and process the steps 3-1, 3-2, 3-3, 3-4 independently and/or in parallel. The DSP system may calculate (e.g., compute, obtain) an incoherent power spectrum by combining (e.g., calculating a M:1 incoherent average power spectrum) outputs of FFT from the four tiles at step 4-1, apply a FIR filter (to remove noise or smooth the power spectrum, for example) to the incoherent power spectrum at step 4-2, and find one or more global Doppler peaks from the incoherent power spectrum at step 4-3, and/or store the one or more global Doppler peaks in a storage (host storage) via DMA. In some implementations, the DSP system may calculate the M:1 incoherent average power spectrum at step 4-1, apply the FIR filter at step 4-2 and perform the global peak finding at step 4-3 before continuing to cross-multiply at steps 7-1, 7-2, 7-3 and IFFT at steps 8-1, 8-2, 8-3.

In some implementations, the DSP system may find one or more local Doppler peaks from N/M samples in a respective one of the M tiles, using the one or more global Doppler peaks, at steps 5-1, 5-2, 5-3, 5-4. The DSP system may perform phase and/or amplitude correction of N/M spectrum in each tile using the corresponding local Doppler peaks at steps 6-1, 6-2, 6-3, 6-4, and calculate (e.g., compute or obtain) a coherent sum or average of the phase/amplitude-corrected N/M length spectrum at step 6-5. In some implementations, the DSP system may perform phase/amplitude correction on the coherent sum or average using the one or more global Doppler peaks to generate a plurality of phase/amplitude-corrected N/M length spectra. In some implementations, the DSP system may generate R sets of Doppler corrections using the one or more global Doppler peaks (e.g., by using one or more Doppler bins that are adjacent (by −R/2 or +R/2) to the global Doppler peaks), and generate three phase corrected N/M length spectra using the corresponding sets of Doppler peaks. The DSP system may cross-multiply each of R phase-corrected N/M spectra by Tx conjugate (e.g., matched filter) at steps 7-1, 7-2, 7-3, and calculate (e.g., compute, obtain) IFFT (e.g., frequency-rake filter) to generate a corresponding range profile at steps 8-1, 8-2, 8-3. In some implementations, the DSP system can process the steps 7-1, 7-2, 7-3 independently and/or in parallel, and process the 8-1, 8-2, 8-3 independently and/or in parallel. The DSP system may combine (e.g., calculating an R:1 incoherent average) the range profiles generated at steps 8-1, 8-2, 8-3 to generate a N/M incoherent range profile at step 9-1. The DSP system may calculate (e.g., compute, obtain) range profile statistics data using the incoherent range profile at step 9-2, and/or find one or more range peaks using the incoherent range profile at step 9-3 and store the one or more range peaks in the host storage via DMA. The DSP system may receive a next shot and repeat the above-noted processing on the next shot.

In some implementations, a DSP system may use a Fast Hadamard Transform (FHT) instead of IFFTs, thereby allowing for decoupling of frontal FFTs from range correlation computation, improved PSLR on unspeckled returns in the circulator, and/or potentially large resource reduction. The DSP system may down-sample (e.g., decimation and low-pass filtering) on N/M samples in each of a plurality of tiles to generate N/M/2 samples, and perform FFT on N/M/2 samples (e.g., using M N/M-length FFTs). The DSP system may perform semi-coherent range processing by performing phase correction in time domain using N samples in each of a plurality of tiles using a plurality of Doppler peaks found using an incoherent average power spectrum. In some implementations, the DSP system may perform a smaller number of FHTs than the number of FFTs. For example, if M FFTs and 1 FHT are performed, the compute cost can be (Mx FFTs+1×FHTs), the CW implementation according to some implementations has approximately 3.5 times the compute cost of a QCW implementation (e.g., implementation shown in FIG. 12). In some implementations, the DSP system may use weighted integration (e.g., weighted incoherent averaging) on phase-corrected samples and/or range profiles.

In some implementations, further to receiving a previous shot (e.g., Rx signal), a DSP system may receive a plurality of ADC samples as a current shot at step 1. The DSP system may divide N samples into M sets of N/M samples perform down-sampling on N/M samples in the respective tiles to generate N/M/2 samples at steps 3-1, 3-2, 3-3, 3-4, and/or perform FFT on N/M/2 samples in the respective tiles at steps 4-1, 4-2, 4-3, 4-4. In some implementations, down-sampling may include decimation and/or filtering (e.g., low-pass filter). In some implementations, the DSP system can process the steps 2-1, 2-2, 2-3, 2-4 independently and/or in parallel, process the steps 3-1, 3-2, 3-3, 3-4 independently and/or in parallel, and process the steps 4-1, 4-2, 4-3, 4-4 independently and/or in parallel. The DSP system may calculate (e.g., compute, obtain, generate) an N/M-length incoherent power spectrum of by combining outputs of FFT from the M tiles at step 5-1, apply a FIR filter (to remove noise or smooth the power spectrum, for example) to the incoherent power spectrum at step 5-2, and find a plurality of Doppler peaks from the incoherent power spectrum at step 4-3, and/or store the plurality of Doppler peaks in a storage (host storage) via DMA. In some implementations, the plurality of Doppler peaks may include one or more Doppler peaks in an $L^{th}$ region corresponding to each of M tiles (e.g., M=4, L=1, 2, 3, 4). In some implementations, the DSP system may calculate the incoherent power spectrum at step 5-1, apply the FIR filter at step 5-2 and perform the Doppler peak finding at step 5-3 before continuing to time domain correction at steps 6-1, 6-2, 6-3, 6-4 and FHT at steps 7-2.

In some implementations, the DSP system may perform phase correction of N/M samples in each tile using the corresponding $R^{th}$ Doppler peaks found at steps 5-3, and calculate (e.g., compute or obtain) a weighted coherent average of the phase-corrected N/M samples at step 7-1. In some implementations, the DSP system may calculate (e.g., compute, obtain) FHT (e.g., using three FHT frequency rake filters) to generate a plurality of range profiles (e.g., R range profiles) at step 7-2. The DSP system may combine (e.g., calculating a weighted incoherent average) the range profiles generated at step 7-2 to generate an N/M weighted incoherent average range profile at step 7-3. The DSP system may calculate (e.g., compute, obtain) range profile statistics data using the weighted incoherent average range profile at step 7-4, and/or find one or more range peaks using the weighted incoherent average range profile at step 7-5 and store the one or more range peaks in the host storage via DMA. The DSP system may receive a next shot and repeat the above-noted processing on the next shot.

Various implementations in the present disclosure have one or more of the following advantages and benefits.

First, implementations in the present disclosure can provide useful techniques for performing an FHT operation with computation cost of O(N log 2 N) of additions/subtractions. The computational cost of an FFT operation is also approximately N log 2 N, but the FFT operation is made up of complex multiplication and addition/subtraction. On the other hand, the simpler nature of the FFT processing according to some implementations can be computationally much cheaper (roughly 10 times in terms of pure logic operations. For example, multiplication may take about 5 times the physical logic as addition, and complex multiplication may use 4 real multiplication while complex addition may use only 2 real additions. Due to the circular correlation properties of m-sequences, the PSLR of the FHT-based processing, according to some implementations, can be superior to the FFT method. It is noted that the FHT method generates an equivalent correlation profile to the FFT method if the FFT is performed on a $2^N-1$ length vector, but non-power of 2 FFTs are significantly more computationally expensive (e.g., several hundred times more computationally expensive). The high PSLR M-sequence is nearly ideal in terms of circular correlation, achieving a PSLR of 10·*log 10($(2^N-1)^{2)}$ $^{in\ power}$. With very high PSLR the dynamic range and requirements on eliminating internal optical reflections can be nearly eliminated, thereby making the overall lidar system much more robust and lowering the cost of components.

Second, implementations in the present disclosure can provide useful techniques for improving the compute utilization by leveraging the SIMD intrinsics (e.g., SIMD commands/instructions) in SIMD capable computing platforms.

Third, implementations in the present disclosure can provide useful techniques for avoiding waste of FFT output. The conventional Doppler/range processing may utilize an FFT and an IFFT in series. The structure of FFT-IFFT in series is not optimal for the following reasons. The structure of FFT-IFFT in series may couple the doppler and range profiles. This means that extra computations may occur when computing the power spectrum in order not to degrade the range resolution. In a power spectrum, a peak can be found between bins in a small subset of the FFT bin, yet a large FFT may be required to achieve a large window, which means that a significant portion of the FFT output may be wasted. Since the FHT based architecture according to some implementation can decouple the range profile and the Doppler profile, decimation can be performed before the FFT reducing the FFT size by at least 2 times and reduce the output waste to by 40%. This decimation can also provide a performance boost since the decimation can remove half of the code spectrum.

Fourth, implementations in the present disclosure can provide useful techniques for providing additional performance boosts by a resampling filter in the power spectrum and by using an FHT. Note that the FHT performance is precisely equivalent to the 2N−1 FFT. To summarize the performance increases, the resampling filter provides a 6 dB PSLR boost (plus at least 3 dB with the decimation filter), and the FHT provides a 38 dB boost relative to the padded code. Additionally, the sidelobe structure is very flat. This is ideal, since structured false positives are less desirable for the perception systems. These performance boosts are only relative to an interferer at an integer doppler away from our doppler correction. For example if there is an internal optical back-reflection at bin 0 and the system doppler corrects for a target at bin 40, the system can achieve excellent PSLR for the circulator interferer. However, if there is a Doppler back reflection at bin 8.64 and the target correction at bin 40, the doppler back reflection can have poor PSLR and sidelobe properties. For this reason frequency broadening should be minimized by design and the Doppler corrections can be limited to integer bin Doppler corrections.

Fifth, implementations in the present disclosure can provide useful techniques for improving peak fitting performance by increasing the symbol rate such that it is equal to the sample rate. Previously, the symbol rate was set to half of the sample rate in order to improve peak fitting performance. It has been shown that convolving the complex range profile with a Gaussian kernel can provide equivalent (slightly improved) peak fitting performance. This peak fitting performance boost may not be dependent on the implementation of the FHT architecture as well. This method can increase Tx symbol rate which increases the range PSLR by 3 dB. Additionally, this sample rate increase can realize the 3 dB increase in doppler PSLR by the decimation.

Figures 13A, 13B:
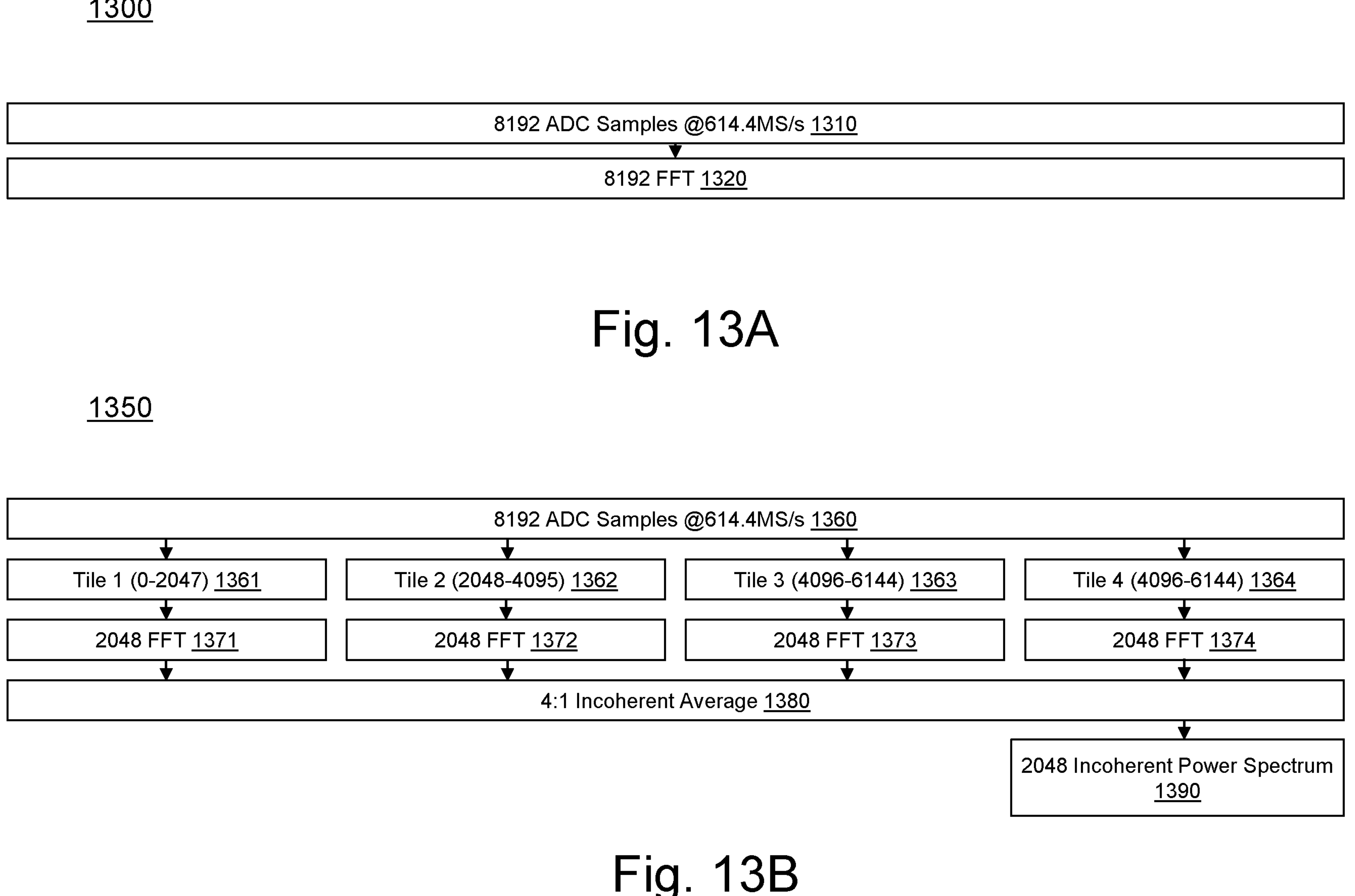
FIG. 13A and FIG. 13B are block diagrams illustrating an example of return signal integration processing, according to some implementations.

FIG. 13A and FIG. 13B are block diagrams illustrating an example of return signal integration processing using a CW laser, according to some implementations. In some implementations, as shown in FIG. 13A, with the CW laser, a DSP system 1300 may perform integration CW processing by (1) receiving ADC samples at step 1310; and/or (2) performing FFT on the samples, respectively, at step 1320. The DSP system 1300 may perform the integration CW processing for a (relatively) longer time (e.g., a longer ranging code matching integration time)).

In some implementations, as shown in FIG. 13B, with the CW laser, a DSP system 1350 may perform integration CW processing by (1) receiving N ADC samples at step 1360; (2)

dividing N samples into M tiles (e.g., pipelines) 1361, 1362, 1363, 1364; (3) performing FFT on N/M samples in the respective tiles at steps 1371, 1372, 1373, 1374; (4) calculating (e.g., computing, obtaining) a M:1 incoherent average of the (M) results of FFT at step 1380; and/or (5) calculating (e.g., computing, obtaining) incoherent power spectrum of the calculated M:1 incoherent average at step 1390. The DSP system 1350 may perform the integration CW processing for a (relatively) shorter time because the ranging code can perform 4 times during the integration period. For example, the DSP system 1350 can process the steps 1361, 1362, 1363, 1364 independently, process the steps 1371, 1372, 1373, 1374 independently, and then combine the (four) results of FFT at step 1380.

Figure 14:
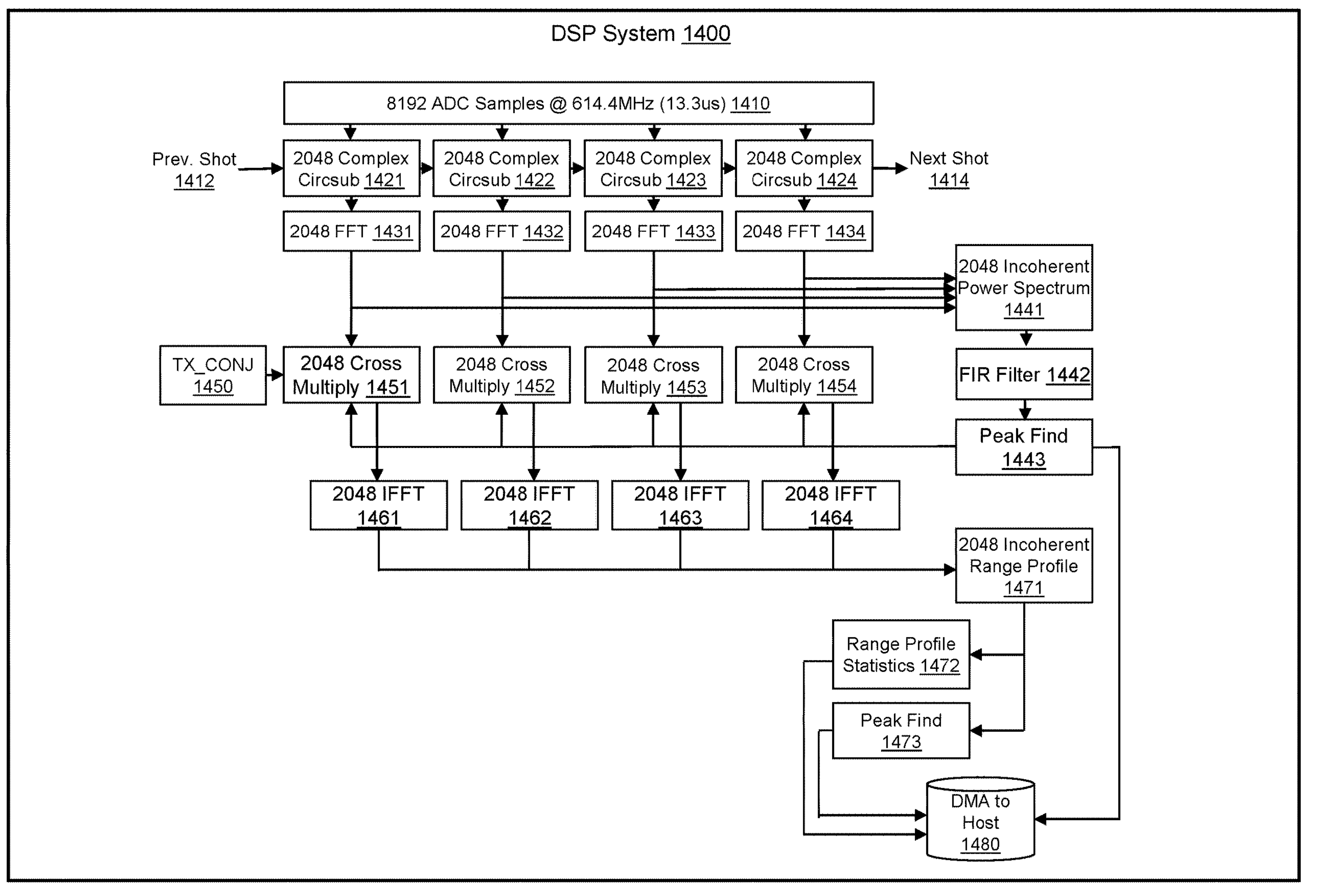
FIG. 14 is a block diagram illustrating an example of a DSP system for Doppler and range pipeline processing, according to some implementations.

FIG. 14 is a block diagram illustrating an example of a DSP system 1400 for Doppler and range pipeline processing, according to some implementations. In some implementations, further to receiving a previous shot (e.g., Rx signal) 1412, the DSP system 1400 may receive a plurality of ADC samples as a current shot at step 1410. The DSP system may divide N samples into four sets of N/M samples (e.g., four tiles, sub-shots, or pipelines), perform preprocessing on the respective tiles at steps 1421, 1422, 1423, 1424, and perform FFT on N/M samples in the respective tiles at steps 1431, 1432, 1433, 1434. The DSP system can process the steps 1421, 1422, 1423, 1424 independently and/or in parallel, and process the steps 1431, 1432, 1433, 1434 independently and/or in parallel. The DSP system may calculate (e.g., compute, obtain) an incoherent power spectrum by combining (e.g., calculating an M:1 incoherent average power spectrum) outputs of FFT from the M tiles at step 1441, apply a FIR filter (to remove noise or smooth the power spectrum, for example) to the incoherent power spectrum at step 1442, and find one or more Doppler peaks from the incoherent power spectrum at step 1443, and/or store the one or more Doppler peaks in a storage (host storage) 1480 via DMA. In some implementations, the DSP system may calculate the M:1 incoherent average power spectrum, apply the FIR filter and perform the peak finding before continuing to cross-multiply at steps 1451, 1452, 1453, 1454 and IFFT at steps 1461, 1462, 1463, 1464.

Referring to FIG. 14, the DSP system 1400 may perform phase correction of N/M samples (e.g., power spectrum) in each tile using the Doppler peaks found at step 1443. The DSP system may cross-multiply each N/M tile spectrum by Tx conjugate (e.g., matched filter) at steps 1451, 1452, 1453, 1454, and calculate (e.g., compute, obtain) IFFT to generate a corresponding range profile at steps 1461, 1462, 1463, 1464. The DSP system can process the steps 1451, 1452, 1453, 1454 independently and/or in parallel, and process the steps 1461, 1462, 1463, 1464 independently and/or in parallel. The DSP system may combine (e.g., calculating a M:1 incoherent average) the range profiles generated at steps 1461, 1462, 1463, 1464 to generate a N/M incoherent range profile at step 1471. The DSP system may calculate (e.g., compute, obtain) range profile statistics data using the incoherent range profile at step 1472, and/or find one or more range peaks using the incoherent range profile at step 1473 and store the one or more range peaks in the host storage via DMA. The DSP system may receive a next shot 1414 and repeat the above-noted processing on the next shot. The CW implementation shown in FIG. 14 may underperform a QCW implementation (e.g., implementation shown in FIG. 12), particularly at low SNR, due to the doppler intolerance of CW ranging codes.

Figure 15:
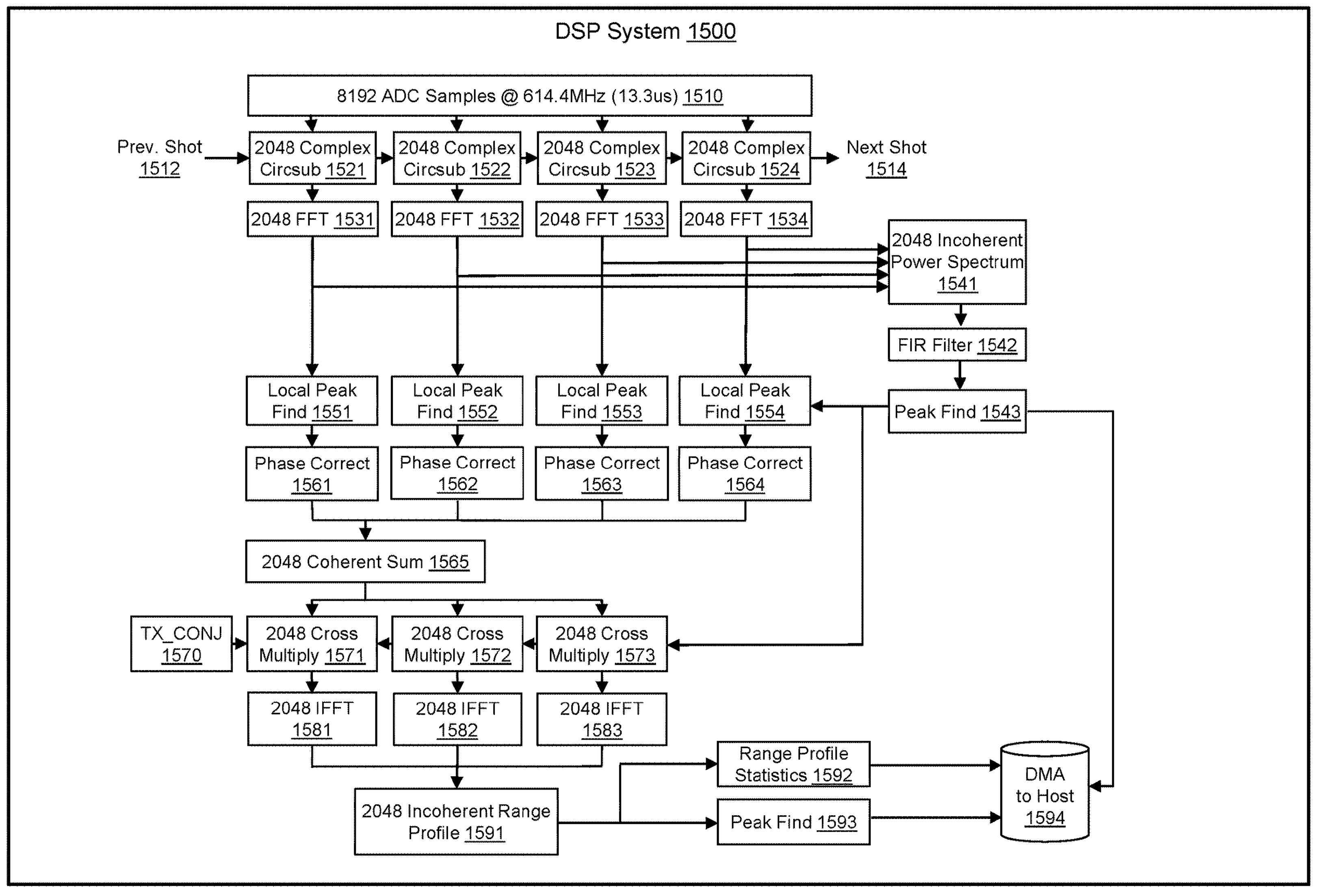
FIG. 15 is a block diagram illustrating another example of a DSP system for Doppler and range pipeline processing, according to some implementations.

FIG. 15 is a block diagram illustrating another example of a DSP system 1500 for Doppler and range pipeline processing, according to some implementations. The DSP system 1500 may perform semi-coherent range processing by (1) performing phase correction based on one or more local Doppler peaks found using N/M samples (e.g., power spectrum) in each of a plurality of tiles, and (2) performing phase correction for finding range peaks based on one or more global Doppler peaks found using an incoherent average power spectrum. Generally, the phase of Doppler peaks and the phase of range peaks are correlated. Thus, the DSP system 1500 can perform, in the range processing stage, phase correction in the frequency domain using the Doppler peaks. To avoid unrealizable compute growth, the DSP system 1500 can use coherent addition (e.g., calculating a coherent sum of phase corrected spectra) prior to calculating a range correlation (e.g., cross-multiplying phase corrected spectrum by a Tx conjugate. In this manner, the DSP system 1500 can perform a smaller number of IFFTs than the number of FFTs. For example, if 4 FFTs and 3 IFFTs are performed, the compute cost can be (4×FFTs+3×IFFTs), the CW implementation according to some implementations has approximately 3.5 times the compute cost of a QCW implementation (e.g., implementation shown in FIG. 12).

Referring to FIG. 15, further to receiving a previous shot (e.g., Rx signal) 1512, the DSP system 1500 may receive a plurality of ADC samples as a current shot at step 1510. The DSP system may divide N samples into M sets of N/M samples (e.g., M tiles, sub-shots, or pipelines), perform preprocessing on the respective tiles at steps 1521, 1522, 1523, 1524, and perform FFT on N/M samples in the respective tiles at steps 1531, 1532, 1533, 1534. The DSP system 1500 can process the steps 1521, 1522, 1523, 1524 independently and/or in parallel, and process the steps 1531, 1532, 1533, 1534 independently and/or in parallel. The DSP system may calculate (e.g., compute, obtain) an incoherent power spectrum by combining (e.g., calculating a M:1 incoherent average power spectrum) outputs of FFT from the M tiles at step 1541, apply a FIR filter (to remove noise or smooth the power spectrum, for example) to the incoherent power spectrum at step 1542, and find one or more global Doppler peaks from the incoherent power spectrum at step 1543, and/or store the one or more global Doppler peaks in a storage (host storage) 1594 via DMA. The DSP system may calculate the 4:1 incoherent average power spectrum at step 1541, apply the FIR filter at step 1542 and perform the global peak finding at step 1543 before continuing to cross-multiply at steps 1571, 1572, 1573 and IFFT at steps 1581, 1582, 1583.

Referring to FIG. 15, the DSP system 1500 may find one or more local Doppler peaks from N/M samples in a respective one of the four tiles, using the one or more global Doppler peaks, at steps 1551, 1552, 1553, 1554. The DSP system may perform phase and/or amplitude correction of N/M spectrum in each tile using the corresponding local Doppler peaks at steps 1561, 1562, 1563, 1564, and calculate (e.g., compute or obtain) a coherent sum or average of the phase-corrected N/M spectrum at step 1565. The DSP system may perform phase and/or amplitude correction on the coherent sum or average using the one or more global Doppler peaks to generate a plurality of phase-corrected N/M spectra (e.g., R phase-corrected N/M spectra). For example, the DSP system may generate R sets of Doppler peaks using the one or more global Doppler peaks (e.g., by adding one or more Doppler bins that are adjacent (by −R/2 or +R/2) to the global Doppler peaks, to a new set of Doppler peaks), and generate R phase corrected N/M spectra using the corresponding sets of Doppler peaks. The DSP system may cross-multiply each of three phase-corrected N/M spectra by Tx conjugate (e.g., matched filter) at steps 1571, 1572, 1573, and calculate (e.g., compute, obtain) IFFT (e.g., frequency rake filter) to generate a corresponding range profile at steps 1581, 1582, 1583. The DSP system can process the steps 1571, 1572, 1573 independently and/or in parallel, and process the 1581, 1582, 1583 independently and/or in parallel. The DSP system may combine (e.g., calculating a R:1 incoherent average) the range profiles generated at steps 1581, 1582, 1583 to generate a N/M incoherent range profile at step 1591. The DSP system may calculate (e.g., compute, obtain) range profile statistics data using the incoherent range profile at step 1592, and/or find one or more range peaks using the incoherent range profile at step 1593 and store the one or more range peaks in the host storage via DMA. The DSP system may receive a next shot 1514 and repeat the above-noted processing on the next shot.

Figure 16:
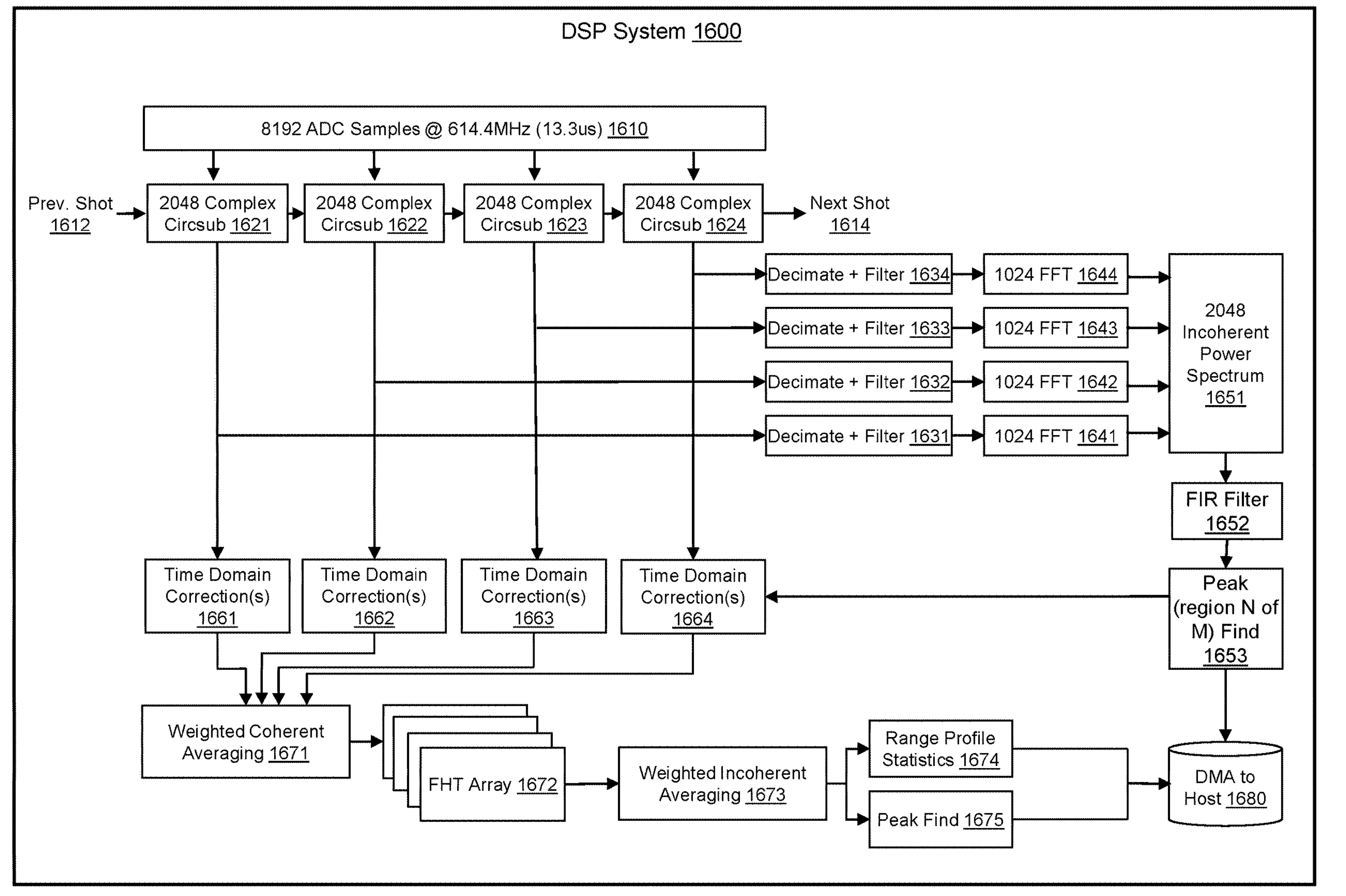
FIG. 16 is a block diagram illustrating yet another example of a DSP system for Doppler and range pipeline processing, according to some implementations.

FIG. 16 is a block diagram illustrating yet another example of a DSP system 1600 for Doppler and range pipeline processing, according to some implementations. The DSP system 1600 may use Fast Hadamard Transform (FHT) instead of IFFTs, thereby allowing for decoupling of frontal FFTs from range correlation computation, improved PSLR on unspeckled returns from internal back-reflections, and/or potentially large resource reduction. The DSP system 1600 may down-sample (e.g., decimation and low-pass filtering) on N/M samples in each of a plurality of tiles (e.g., M tiles) to generate N/M/2 samples, and perform FFT on N/M/2 samples (e.g., using M N/M/2-length FFT array). The DSP system 1600 may perform semi-coherent range processing by performing phase correction in time domain using N/M samples in each of a plurality of tiles using a plurality of Doppler peaks found using an incoherent average power spectrum. The DSP system 1600 may perform a smaller number of FHTs (e.g., R FHT comb filters) than the number of FFTs. For example, if M FFTs and R FHTs are performed, the compute cost can be (Mx FFTs+Rx FHTs), the CW implementation according to some implementations has approximately 3.5 times the compute cost of a QCW implementation (e.g., implementation shown in FIG. 12). The DSP system 1600 may use weighted integration (e.g., weighted incoherent averaging) on phase and/or amplitude-corrected samples and/or range profiles.

Referring to FIG. 16, further to receiving a previous shot (e.g., Rx signal) 1612, the DSP system 1600 may receive a plurality of ADC samples as a current shot at step 1610. The DSP system may divide N samples into M sets of N/M samples (e.g., M tiles, sub-shots, or pipelines), perform pre-processing on the respective tiles at steps 1621, 1622, 1623, 1624, perform down-sampling on N/M samples in the respective tiles to generate N/M/2 samples at steps 1631, 1632, 1633, 1634, and/or perform FFT on N/M/2 samples in the respective tiles at steps 1641, 1642, 1643, 1644. Down-sampling may include decimation and/or filtering (e.g., low-pass filter). The DSP system can process the steps 1621, 1622, 1623, 1624 independently and/or in parallel, process the steps 1631, 1632, 1633, 1634 independently and/or in parallel, and process the steps 1641, 1642, 1643, 1644 independently and/or in parallel. The DSP system may calculate (e.g., compute, obtain, generate) an N/M-length incoherent power spectrum by combining outputs of FFT from the M tiles at step 1651, apply a FIR filter (to remove noise or smooth the power spectrum, for example) to the incoherent power spectrum at step 1652, and find a plurality of Doppler peaks from the incoherent power spectrum at step 1643, and/or store the plurality of Doppler peaks in a storage (host storage) 1680 via DMA. The plurality of Doppler peaks may include one or more Doppler peaks in an $L^{th}$ region corresponding to each of M tiles (e.g., M=4, L=1, 2, 3, 4). In some implementations, the DSP system may calculate the incoherent power spectrum at step 1651, apply the FIR filter at step 1652 and perform the Doppler peak finding at step 1653 before continuing to time domain correction at steps 1661, 1662, 1663, 1664 and FHT at steps 1672.

Referring to FIG. 16, the DSP system 1600 may perform phase correction of N/M samples in each tile using the corresponding $L^{th}$ Doppler peaks found at steps 1653, and calculate (e.g., compute or obtain) a weighted coherent average of the phase-corrected N/M samples at step 1671. The DSP system may calculate (e.g., compute, obtain) FHT to generate a plurality of range profiles (e.g., R range profiles) at step 1672. The DSP system may combine (e.g., calculating a weighted incoherent average) the range profiles generated at step 1672 to generate an N/M weighted incoherent average range profile at step 1673. The DSP system may calculate (e.g., compute, obtain) range profile statistics data using the weighted incoherent average range profile at step 1674, and/or find one or more range peaks using the weighted incoherent average range profile at step 1675 and store the one or more range peaks in the host storage 1680 via DMA. The DSP system may receive a next shot 1614 and repeat the above-noted processing on the next shot.

Figure 17:
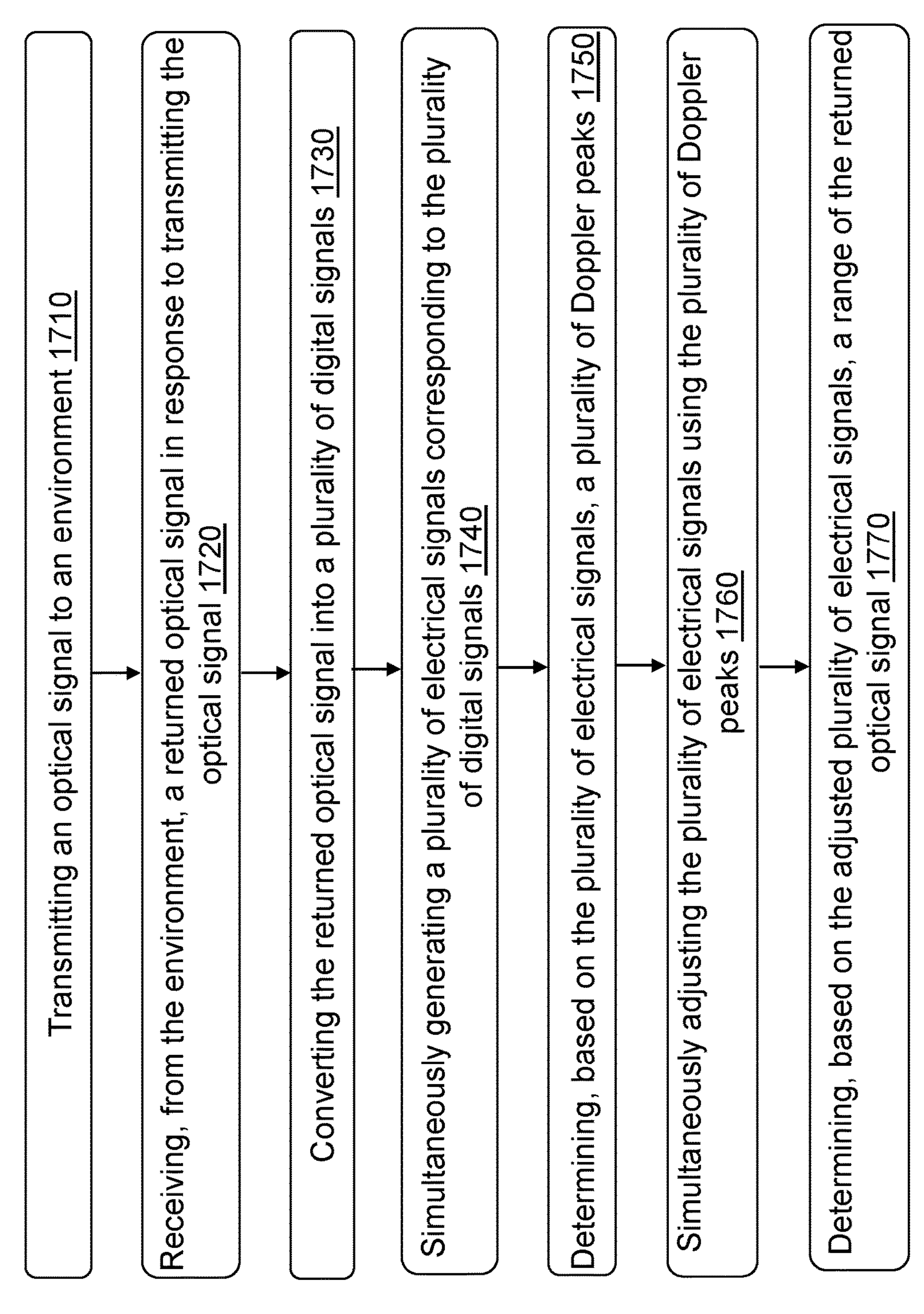
FIG. 17 is a flowchart illustrating an example methodology for Doppler and range pipeline processing according to some implementations.

FIG. 17 is a flowchart illustrating an example methodology for Doppler and range pipeline processing in a DSP system (e.g., DSP system 1400, 1500, 1600) of a LIDAR system (e.g., LIDAR sensor system 300) including one or more processors (e.g., processors 410), according to some implementations. In this example methodology, a process 1700 begins at step 1710 by transmitting an optical signal to an environment.

At step 1720, in some implementations, the one or more processors may receive, from the environment, a returned optical signal (e.g., Rx signal or shot) in response to transmitting the optical signal.

At step 1730, in some implementations, the one or more processors may convert the returned optical signal into a plurality of digital signals (e.g., four tiles of N/M samples generated from N ADC samples received at step 1610 in FIG. 16).

At step 1740, in some implementations, the one or more processors may simultaneously generate a plurality of electrical signals (e.g., M tiles of N/M/2 power spectra generated by FFT at steps 1641, 1642, 1643, 1644) corresponding to the plurality of digital signals. In some implementations, in simultaneously generating the plurality of electrical signals, the one or more processors may simultaneously generate each of the plurality of electrical signals based on a Fast Fourier Transform of a corresponding digital signal (e.g., N/M samples in the corresponding tile).

At step 1750, in some implementations, the one or more processors may determine, based on the plurality of electrical signals, a plurality of Doppler peaks (e.g., Doppler peaks found at step 1653). In some implementations, in determining the plurality of Doppler peaks, the one or more processors may simultaneously determine a corresponding Doppler peak in each electrical signal of plurality of digital signals (e.g., determining local Doppler peaks in four tiles at step 1551, 1552, 1553, 1554). In some implementations, the one or more processors may generate a power spectrum of the plurality of electrical signals (e.g., power spectrum as a result of FFT). The one or more processors may determine, based on the power spectrum, one or more Doppler peaks.

The one or more processors may determine, based on the power spectrum, a plurality of Doppler peaks.

At step 1760, in some implementations, the one or more processors may simultaneously adjust the plurality of electrical signals using the plurality of Doppler peaks (e.g., phase correction based on the Doppler peaks at steps 1661, 1662, 1663, 1664). In simultaneously adjusting the plurality of electrical signals, the one or more processors are further configured to simultaneously adjust a phase of each electrical signal of the plurality of digital signals using the corresponding Doppler peak (e.g., time domain phase correction of samples in the first tile using the corresponding Doppler peaks in the first region at step 1661). In simultaneously adjusting the plurality of electrical signals, the one or more processors may simultaneously perform a time-domain adjustment on each electrical signal of the plurality of electrical signals using the plurality of Doppler peaks.

At step 1770, in some implementations, the one or more processors may determine, based on the adjusted plurality of electrical signals (e.g., phase corrected samples as a result of phase corrections at steps 1561, 1562, 1563, 1564), a range of the returned optical signal. The one or more processors may generate a coherent sum of the adjusted plurality of electrical signals (e.g., coherent sum calculated at step 1565). In determining the range of the returned optical signal, the one or more processors may simultaneously determine, based on the coherent sum of the adjusted plurality of electrical signals, one or more range profiles corresponding to the one or more Doppler peaks (e.g., range profiles as a result of respective IFFT at steps 1581, 1582, 1583). The one or more processors may determine, based on the plurality of range profiles, an incoherent range profile (e.g., incoherent range profile generated at step 1591). The one or more processors may determine, based on a cross correlation of the incoherent range profile (e.g., cross correlation of the incoherent range profile generated at step 1591), a peak of the incoherent range profile (e.g., peak found at step 1593). The one or more processors may determine, based on the peak of the incoherent range profile (e.g., peak found at step 1593), the range of the returned optical signal.

In some implementations, in determining the range of the returned optical signal, the one or more processors may determine a weighted coherent average of the adjusted plurality of electrical signals (e.g., weighted coherent average computed at step 1671). The one or more processors may perform a Fast Hadamard Transform (FHT) on the weighted coherent average (e.g., FHT performed at step 1672). The one or more processors may determine a weighted incoherent average of one or more results of the Fast Hadamard Transform (e.g., weighted incoherent average computed at step 1673). The one or more processors may determine a peak of the weighted incoherent average (e.g., range peak found at step 1675). The one or more processors may determine, based on the peak of the weighted incoherent average, the range of the returned optical signal.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A light detection and ranging (LIDAR) system, the LIDAR system comprising:

one or more processors; and one or more computer-readable storage mediums storing instructions which, when executed by the one or more processors, cause the one or more processors to:

transmit an optical signal to an environment;

receive, from the environment, a returned optical signal in response to transmitting the optical signal;

generate, based on the returned optical signal, an electrical signal;

determine a Doppler frequency shift in the returned optical signal based on the electrical signal;

adjust the electrical signal using the Doppler frequency shift;

divide the adjusted electrical signal into a plurality of electrical signals; and determine a range of the returned optical signal by performing a Fast Hadamard Transform (FHT) operation on the plurality of electrical signals in parallel, wherein the FHT operation directly converts the plurality of electrical signals from time domain data to range domain data, and the range is determined from the range domain data.

2. The LIDAR system as recited in claim 1, wherein in transmitting the optical signal to the environment, the one or more processors are further configured to:

modulate, based on a sequence code that is indicative of a sequence of phases for the optical signal, the optical signal to produce a phase-encoded optical signal; and transmit the phase-encoded optical signal to the environment.

3. The LIDAR system as recited in claim 1, wherein in determining the range of the returned optical signal, the one or more processors are further configured to:

perform, based on a sequence code that is indicative of a sequence of phases for the transmitted optical signal, the Fast Hadamard Transform on the adjusted electrical signal.

4. The LIDAR system as recited in claim 1, wherein the FHT operation is performed on the plurality of electrical signals using a single instruction multiple data (SIMD) parallel processing.

5. The LIDAR system as recited in claim 1, wherein performing the Fast Hadamard Transform (FHT) operation comprises one of permutating vectors, adding a first vector and a second vector, or subtracting the second vector from the first vector.

6. The LIDAR system as recited in claim 5, wherein in determining the range of the returned optical signal, the one or more processors are further configured to:

determine a peak of a result of the Fast Hadamard Transform; and determine, based on the peak, the range of the returned optical signal.

7. The LIDAR system as recited in claim 5, wherein the one or more processors are further configured to:

perform the Fast Hadamard Transform using a single instruction multiple data (SIMD) parallel processing, performing the adding operation and the subtracting operation in parallel, and performing the permutating operation in a single operation.

8. The LIDAR system as recited in claim 1, wherein in performing the Fast Hadamard Transform, the one or more processors are further configured to:

execute a stage of second type after executing $\log_2 R$ stages of first type, where R=N/K.

9. The LIDAR system as recited in claim 1, wherein in determining the Doppler frequency shift in the returned optical signal, the one or more processors are further configured to:

resample the electrical signal in time domain; and determine the Doppler frequency shift in the returned optical signal in time domain based on a power of two Fast Fourier Transforms of the electrical signal.

10. The LIDAR system as recited in claim 9, wherein the electrical signal is adjusted in time domain using the Doppler frequency shift.

11. An autonomous vehicle control system comprising:

one or more processors; and one or more computer-readable storage mediums storing instructions which, when executed by the one or more processors, cause the one or more processors to:

transmit an optical signal to an environment;

receive, from the environment, a returned optical signal in response to transmitting the optical signal;

generate, based on the returned optical signal, an electrical signal;

determine a Doppler frequency shift in the returned optical signal based on the electrical signal;

adjust the electrical signal using the Doppler frequency shift;

divide the adjusted electrical signal into a plurality of electrical signals;

determine a range of the returned optical signal by performing a Fast Hadamard Transform (FHT) operation on the plurality of electrical signals in parallel, wherein the FHT operation directly converts the plurality of electrical signals from time domain data to range domain data, and the range is determined from the range domain data; and control operation of a vehicle using the range of the returned optical signal.

12. The autonomous vehicle control system as recited in claim 11, wherein in transmitting the optical signal to the environment, the one or more processors are further configured to:

modulate, based on a sequence code that is indicative of a sequence of phases for the optical signal, the optical signal to produce a phase-encoded optical signal; and transmit the phase-encoded optical signal to the environment.

13. The autonomous vehicle control system as recited in claim 11, wherein in determining the range of the returned optical signal, the one or more processors are further configured to:

perform, based on a sequence code that is indicative of a sequence of phases for the transmitted optical signal, the Fast Hadamard Transform on the adjusted electrical signal.

14. The autonomous vehicle control system as recited in claim 11, wherein the FHT operation is performed on the plurality of electrical signals using a single instruction multiple data (SIMD) parallel processing.

15. The autonomous vehicle control system as recited in claim 11, wherein performing the Fast Hadamard Transform (FHT) operation on the adjusted electrical signal comprises one of permutating vectors, adding a first vector and a second vector, or subtracting the second vector from the first vector.

16. The autonomous vehicle control system as recited in claim 15, wherein in determining the range of the returned optical signal, the one or more processors are further configured to:

determine a peak of a result of the Fast Hadamard Transform; and determine, based on the peak, the range of the returned optical signal.

17. An autonomous vehicle comprising:

at least one of a steering system or a braking system; and a vehicle controller comprising one or more processors configured to:

transmit an optical signal to an environment;

receive, from the environment, a returned optical signal in response to transmitting the optical signal;

generate, based on the returned optical signal, an electrical signal;

determine a Doppler frequency shift in the returned optical signal based on the electrical signal;

adjust the electrical signal using the Doppler frequency shift;

divide the adjusted electrical signal into a plurality of electrical signals;

determine a range of the returned optical signal by performing a Fast Hadamard Transform (FHT) operation on the plurality of electrical signals in parallel, wherein the FHT operation directly converts the plurality of electrical signals from time domain data to range domain data, and the range is determined from the range domain data; and control the at least one of the steering system or the braking system using the range of the returned optical signal.

18. The autonomous vehicle as recited in claim 17, wherein in transmitting the optical signal to the environment, the one or more processors are further configured to:

modulate, based on a sequence code that is indicative of a sequence of phases for the optical signal, the optical signal to produce a phase-encoded optical signal; and transmit the phase-encoded optical signal to the environment.

19. The autonomous vehicle as recited in claim 17, wherein in determining the range of the returned optical signal, the one or more processors are further configured to:

perform, based on a sequence code that is indicative of a sequence of phases for the transmitted optical signal, the Fast Hadamard Transform on the adjusted electrical signal.

20. The autonomous vehicle as recited in claim 17, wherein the FHT operation is performed on the plurality of electrical signals using a single instruction multiple data (SIMD) parallel processing.

* * * * *